United States Patent
Hah et al.

(10) Patent No.: US 12,473,278 B2
(45) Date of Patent: Nov. 18, 2025

(54) IMIDAZOLE DERIVATIVE EXPRESSING FLT3 INHIBITORY ACTIVITY, AND USE THEREOF

(71) Applicant: Industry—University Cooperation Foundation Hangyang University Erica Campus, Gyeonggi-do (KR)

(72) Inventors: Jung Mi Hah, Seoul (KR); Da Seul Im, Gyeonggi-do (KR)

(73) Assignee: Industry-University Cooperation Foundation Hanyang University Erica Campus, Gyeonggi-do (KR)

(*) Notice: Subject to any disclaimer, the term of this patent is extended or adjusted under 35 U.S.C. 154(b) by 938 days.

(21) Appl. No.: 17/634,010

(22) PCT Filed: Aug. 12, 2020

(86) PCT No.: PCT/KR2020/010667
§ 371 (c)(1),
(2) Date: Feb. 9, 2022

(87) PCT Pub. No.: WO2021/029665
PCT Pub. Date: Feb. 18, 2021

(65) Prior Publication Data
US 2022/0315573 A1 Oct. 6, 2022

(30) Foreign Application Priority Data
Aug. 13, 2019 (KR) .................. 10-2019-0098801

(51) Int. Cl.
*C07D 413/14* (2006.01)
*C07D 413/12* (2006.01)

(52) U.S. Cl.
CPC ......... *C07D 413/14* (2013.01); *C07D 413/12* (2013.01)

(58) Field of Classification Search
CPC ........................... C07D 413/14; C07D 413/12
See application file for complete search history.

(56) References Cited

U.S. PATENT DOCUMENTS

| 9,145,415 B2 | 9/2015 | Takasaki et al. |
| 2011/0281917 A1 | 11/2011 | Stuart |

FOREIGN PATENT DOCUMENTS

| CN | 109970717 A | 7/2019 |
| KR | 1020100137742 A | 12/2010 |
| KR | 1020110040384 A | 4/2011 |
| KR | 1020160125527 A | 10/2016 |

OTHER PUBLICATIONS

International Search Report for PCT/KR2020/010667, mailed on Nov. 18, 2020, 5 pages.

*Primary Examiner* — Paul V Ward
(74) *Attorney, Agent, or Firm* — McNeill PLLC

(57) ABSTRACT

The present invention relates to a novel benzimidazole derivative having fms-like tyrosine kinase 3 (FLT3) inhibitory activity, and a use thereof. A novel benzimidazole derivative or a pharmaceutically acceptable salt thereof, according to the present invention, exhibits excellent inhibitory activity against FLT3, and thus targeted treatment through more fundamental approaches is expected in the prevention or treatment of acute myeloid leukemia (AML).

9 Claims, 1 Drawing Sheet

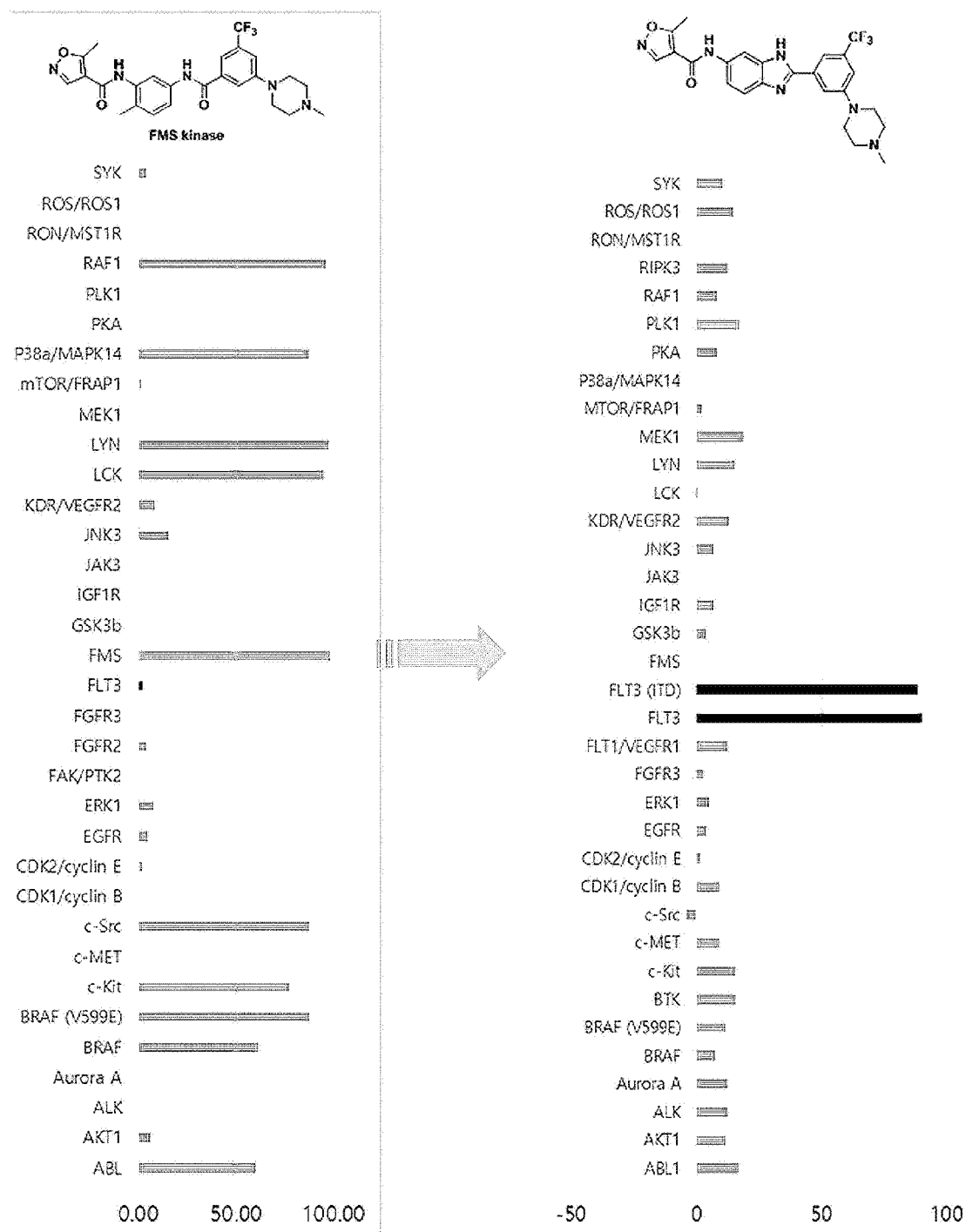

IMIDAZOLE DERIVATIVE EXPRESSING FLT3 INHIBITORY ACTIVITY, AND USE THEREOF

CROSS-REFERENCE TO RELATED APPLICATIONS

This application is a national phase entry pursuant to 35 U.S.C. § 371 of International Application No. PCT/KR2020/010667, filed Aug. 12, 2020, which claims priority to Korean Application No. 10-2019-0098801, filed Aug. 13, 2019, each of which is incorporated by reference herein in its entirety for any purpose.

TECHNICAL FIELD

The present invention relates to a novel benzimidazole derivative having fms-like tyrosine kinase 3 (FLT3) inhibitory activity, and a use thereof.

The present invention was made with the support of the Ministry of Science and ICT (2017Y) under Grant No. 201900000000866, the R&D management agency of the project is "the National Research Foundation of Korea", the R&D project title is "the Basic Research Business in Science and Engineering Field/Midcareer Researcher Supporting Business/Mid-Sized Research (total research cost: more than 150 million Korean won to 300 million or less Korean won)", the research title is "Research on JNK3 regulators with mechanism for AP formation and simultaneous inhibition of toxicity as AD preventive/therapeutic agent", and the research period is "Mar. 1, 2019 to Feb. 29, 2020".

The present patent application claims priority to and the benefit of Korean Patent Application No. 10-2019-0098801, filed on Aug. 13, 2019, the disclosure of which is incorporated herein by reference in its entirety.

BACKGROUND ART

Fms-like tyrosine kinase 3 (FLT3) is a type of transmembrane receptor tyrosine kinase expressed in lymph-hematopoietic cells, and is a target for acute myeloid leukemia (AML), which is drawing attention because FLT3 is involved in the regulation of survival, proliferation and differentiation of hematopoietic stem/progenitor cells in a patient with AML. When the FLT3 ligand binds to FLT3 kinase, FLT3 is activated and autophosphorylated. Subsequently, FLT3 activates multiple downstream signaling pathways including signal transducer and activator of transcription 5 (STATS), Ras/mitogen-activated protein kinase (Ras/MAPK) and phosphatidylinositol 3-kinase/Akt pathways, resulting in playing an important role in the proliferation and survival of cells and immune responses. However, mutated FLT3 causes activation regardless of the presence or absence of a ligand. FLT3 mutations can be categorized by mutation location and type, represented by internal tandem duplications (ITD) and point mutation in tyrosine kinase domain (TKD). FLT3-ITD mutations account for 20 to 30% of patients with AML and are importantly directly linked to an abnormal increase in leukocytes and poor prognosis, and point mutations in TKD are found in 5% of AML cases. Despite the importance of finding a therapy for AML, the number of therapeutic materials approved to date, such as midostaurin and gilteritinib (ASP2215) is very small.

Several clinical candidates targeting FLT3, such as lestaurtinib (Blood. 103 (2004)), midostaurin (Blood. 105 (2004)), tandutinib (Blood. 108 (2006)), sorafenib (J. Natl. Cancer Inst. 100 (2008) 184-98), KW-2449 (Blood. 114 (2009)), and quizartinib (Blood. 114 (2009)) have been reported. Among them, lestaurtinib and midostaurin are indolocarbazole derivatives and well-known multi-targeting tyrosine kinase inhibitors. A piperazinyl-quinazoline compound, tandutinib, inhibits FLT3 as well as c-Kit and PDGFR. Most of these inhibitors were redirected to AML by the inhibition of the FLT3-ITD mutation from their initial purpose of targeting other kinases. Further, since it was discovered that palbociclib, which was used as a therapeutic agent for breast cancer as a FLT3 inhibitor, is effective in treating patients with AML, it is judged that the FLT3 inhibitor can be used for both breast cancer and acute leukemia. It seems that most of the current FLT3 inhibitors, with the exception of quizartinib, are unimpressive mainly because of their low potency and target selectivity (Blood. 108 (2006), Blood. 104 (2015), J. Clin. Oncol. 28 (2010) 1856-62, Blood. 113 (2009)). Therefore, there is currently a strong need for the development of a potent FLT3 kinase inhibitor.

DISCLOSURE

Technical Problem

The present invention has been made to solve the problem as described above, and as a result of intensive studies to find a novel material which is likely to be developed as a therapeutic agent for acute myeloid leukemia (AML), the present inventors confirmed a novel benzimidazole derivative showing FLT3 inhibitory activity, thereby completing the present invention based on this.

Thus, an object of the present invention is to provide a novel benzimidazole derivative having FLT3 inhibitory activity, or a pharmaceutically acceptable salt thereof.

Another object of the present invention is to provide a method for preparing a novel benzimidazole derivative having FLT3 inhibitory activity.

Still another object of the present invention is to provide a pharmaceutical composition for preventing or treating acute myeloid leukemia (AML), including the benzimidazole derivative or a pharmaceutically acceptable salt thereof as an active ingredient.

Yet another object of the present invention is to provide a method for treating acute myeloid leukemia (AML), the method including: administering the benzimidazole derivative or a pharmaceutically acceptable salt thereof to an individual or subject in need thereof.

Yet another object of the present invention is to provide the benzimidazole derivative or a pharmaceutically acceptable salt thereof for use in the treatment of acute myeloid leukemia (AML).

Yet another object of the present invention is to provide a use of the benzimidazole derivative or a pharmaceutically acceptable salt thereof for use in the preparation of a medicament for treating acute myeloid leukemia (AML).

However, technical problems to be solved by the present invention are not limited to the aforementioned problems, and other problems that are not mentioned may be clearly understood by the person skilled in the art from the following description.

Technical Solution

To achieve the aforementioned objects of the present invention, the present invention provides a compound represented by the following Chemical Formula 1 or a pharmaceutically acceptable salt thereof.

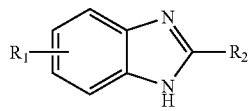

[Chemical Formula 1]

In Chemical Formula 1,
R₁ is

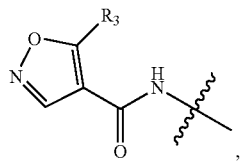

,

R₂ is selected from the group consisting of

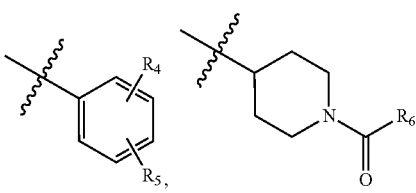

and a $C_3$-$C_7$ cycloalkyl,
R₃ is hydrogen, hydroxy, a $C_1$-$C_6$ alkyl or a $C_1$-$C_6$ alkyl halide,
R₄ and R₅ are each independently selected from the group consisting of hydrogen, a $C_1$-$C_6$ alkyl,

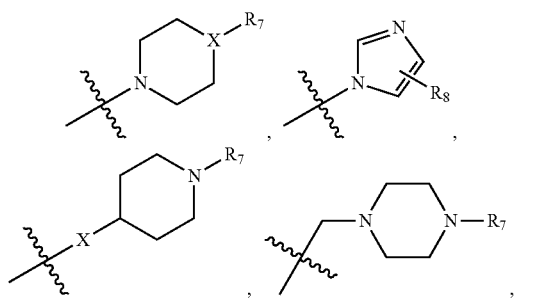

, a $C_1$-$C_6$ alkyl halide and a halogen,
R₆ is hydrogen or a $C_1$-$C_6$ alkyl, and
wherein, X is methylene, a nitrogen or an oxygen atom, and R₇ and R₈ are each independently hydrogen or a $C_1$-$C_6$ alkyl.

Further, the present invention provides a pharmaceutical composition for preventing or treating acute myeloid leukemia (AML), including the derivative of Chemical Formula 1 or a pharmaceutically acceptable salt thereof as an active ingredient.

As an exemplary embodiment of the present invention, the composition may inhibit the activity of fms-like tyrosine kinase 3 (FLT 3).

In addition, the present invention provides a method for treating acute myeloid leukemia (AML), the method including: administering the derivative of Chemical Formula 1 or a pharmaceutically acceptable salt thereof to an individual.

Furthermore, the present invention provides a use of the derivative of Chemical Formula 1 or a pharmaceutically acceptable salt thereof for treating acute myeloid leukemia (AML) disease.

Advantageous Effects

Since a novel benzimidazole derivative or a pharmaceutically acceptable salt thereof, according to the present invention exhibits inhibitory activity as an excellent target against fms-like tyrosine kinase 3 (FLT 3), a pharmaceutical composition including the derivative can be usefully used for the prevention and treatment of cancer including acute myeloid leukemia (AML).

DESCRIPTION OF DRAWINGS

FIG. 1 is a view illustrating the selective FLT3 inhibitory activity of Compound 5a of the present invention.

MODES OF THE INVENTION

Hereinafter, the present invention will be described in detail.

The present invention provides a compound of the following Chemical Formula 1, or a pharmaceutically acceptable salt thereof.

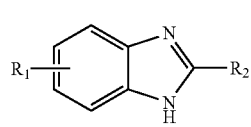

[Chemical Formula 1]

In Chemical Formula 1,
R₁ is

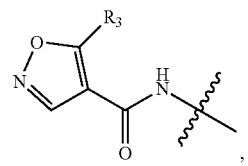

,

R₂ is selected from the group consisting of

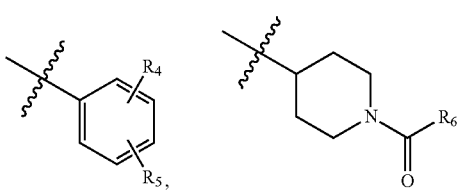

and a $C_3$-$C_7$ cycloalkyl,
R₃ is hydrogen, hydroxy, a $C_1$-$C_6$ alkyl or a $C_1$-$C_6$ alkyl halide,
R₄ and R₅ are each independently selected from the group consisting of hydrogen, a $C_1$-$C_6$ alkyl,

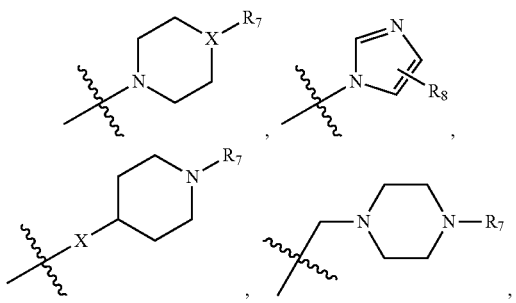

a $C_1$-$C_6$ alkyl halide and a halogen,
$R_6$ is hydrogen or a $C_1$-$C_6$ alkyl, and
wherein, X is methylene, a nitrogen or an oxygen atom, and $R_7$ and $R_8$ are each independently hydrogen or a $C_1$-$C_6$ alkyl.

Wherein, "alkyl" refers to a linear and branched saturated hydrocarbon group generally having a specified number of carbon atoms (for example, 1 to 12 carbon atoms). Examples of an alkyl group include methyl, ethyl, n-propyl, isopropyl, n-butyl, sec-butyl, isobutyl, tert-butyl, n-pentyl, n-hexyl, n-heptyl, and the like without limitation. An alkyl may be attached to a parent group or a substrate at any ring atom if the attachment does not violate valence requirements. Similarly, an alkyl group or an alkenyl group may include one or more non-hydrogen substituents if the attachment does not violate valence requirements.

"Cycle" refers to a saturated monocyclic and polycyclic hydrocarbon ring generally having a specified number of carbon atoms, including a ring (that is, a $C_{3-10}$ cycloalkyl refers to a cycle having 3, 4, 5, 6, 7, 8, 9 or 10 carbon atoms as a ring member).

"Halogen" is an element belonging to Group 17 of the Periodic Table, and easily becomes an anion by obtaining electrons from other elements because there are seven electrons in the outermost electron shell. The halogen is usually present in the form of other elements and compounds because it is the most non-metallic and highly reactive in each period. Examples thereof include fluorine, chlorine, bromine, iodine, and the like.

"Alkyl halide" refers to a compound in which one hydrogen atom of an alkyl is substituted with a halogen element, and is named a primary, secondary, tertiary alkyl halide, and the like, according to the number of carbons attached to the carbon attached to the halogen. Examples of the alkyl halide include methyl halide, vinyl halide, aryl halide, allyl halide, benzyl halide, and the like without limitation. The alkyl halide may be attached to a parent group or a substrate at any ring atom if the attachment does not violate valence requirements.

"Methylene" refers to a divalent group of atoms obtained by removing two hydrogen atoms from methane.

In an exemplary embodiment of the present invention, the compound of Chemical Formula 1 may have a structure of the following Chemical Formula 2.

[Chemical Formula 2]

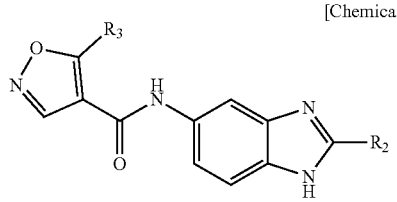

In Chemical Formula 2,
$R_2$ is selected from the group consisting of

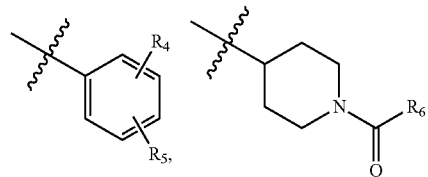

and a $C_3$-$C_7$ cycloalkyl,
$R_3$ is hydrogen, hydroxy, a $C_1$-$C_6$ alkyl or a $C_1$-$C_6$ alkyl halide,
$R_4$ and $R_5$ are each independently selected from the group consisting of hydrogen, a $C_1$-$C_6$ alkyl,

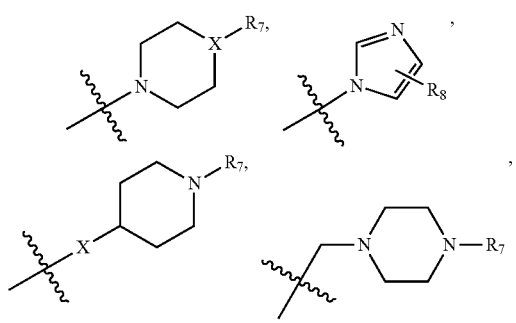

a $C_1$-$C_6$ alkyl halide and a halogen,
$R_6$ is hydrogen or a $C_1$-$C_6$ alkyl, and
wherein, X is methylene, a nitrogen or an oxygen atom, and $R_7$ and $R_8$ are each independently hydrogen or a $C_1$-$C_6$ alkyl.

In another exemplary embodiment of the present, in the benzimidazole derivative of Chemical Formula 1 of the present invention, the compound of Chemical Formula 1 may be a compound having a structure of the following Chemical Formula 3.

[Chemical Formula 3]

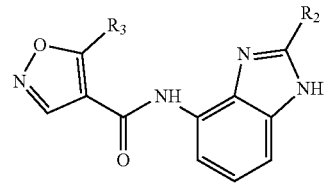

In Chemical Formula 3,
$R_2$ is selected from the group consisting of

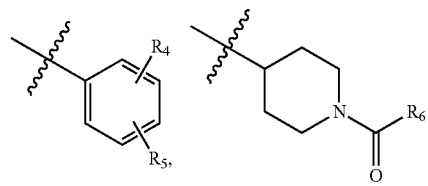

and a $C_3$-$C_7$ cycloalkyl, $R_3$ is hydrogen, hydroxy, a $C_1$-$C_6$ alkyl or a $C_1$-$C_6$ alkyl halide, $R_4$ and $R_5$ are each independently selected from the group consisting of hydrogen, a $C_1$-$C_6$ alkyl,

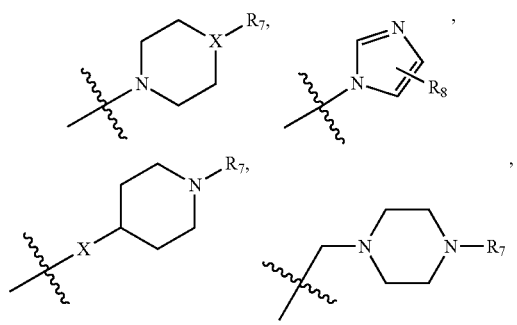

a $C_1$-$C_6$ alkyl halide and a halogen, $R_6$ is hydrogen or a $C_1$-$C_6$ alkyl, and wherein, X is methylene, a nitrogen or an oxygen atom, and $R_7$ and $R_8$ are each independently hydrogen or a $C_1$-$C_6$ alkyl.

As still another exemplary embodiment of the present invention, $R_2$ is

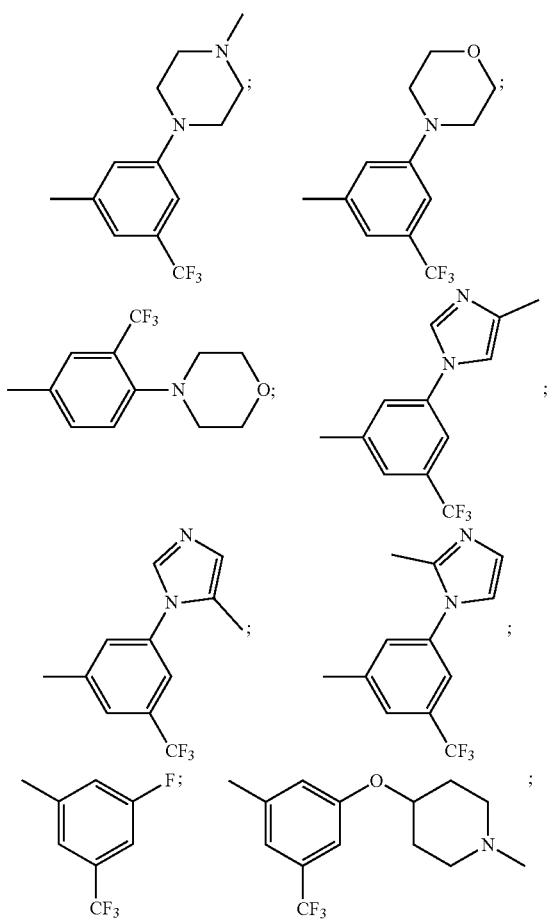

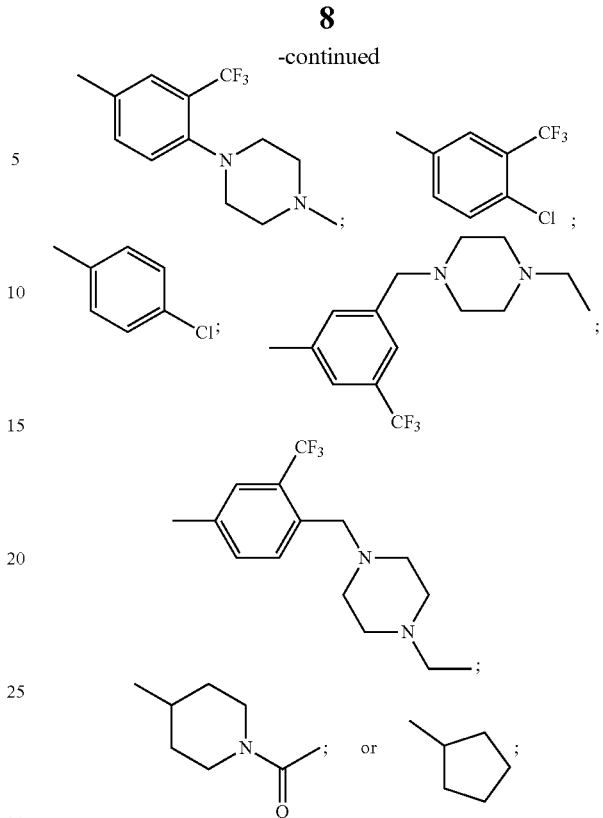

and $R_3$ may be a $C_1$-$C_6$ alkyl.

As yet another exemplary embodiment of the present invention, the benzimidazole derivative of Chemical Formula 1 may be a compound, which is 5-methyl-N-(2-(3-(4-methylpiperazin-1-yl)-5-(trifluoromethyl)phenyl)-1H-benz[d]imidazol-5-yl)isoxazole-4-carboxamide;

5-methyl-N-(2-(3-morpholino-5-(trifluoromethyl)phenyl)-1H-benz[d]imidazol-5-yl)isoxazole-4-carboxamide;

5-methyl-N-(2-(4-morpholino-3-(trifluoromethyl)phenyl)-1H-benz[d]imidazol-5-yl)isoxazole-4-carboxamide;

5-methyl-N-(2-(3-(4-methyl-1H-imidazol-1-yl)-5-(trifluoromethyl)phenyl)-1H-benz[d]imidazol-5-yl)isoxazole-4-carboxamide;

5-methyl-N-(2-(3-(5-methyl-1H-imidazol-1-yl)-5-(trifluoromethyl)phenyl)-1H-benz[d]imidazol-5-yl)isoxazole-4-carboxamide;

5-methyl-N-(2-(3-(2-methyl-1H-imidazol-1-yl)-5-(trifluoromethyl)phenyl)-1H-benz[d]imidazol-5-yl)isoxazole-4-carboxamide;

5-methyl-N-(2-4-(4-methylpiperazin-1-yl)-3-(trifluoromethyl)phenyl)-1H-benz[d]imidazol-5-yl)isoxazole-4-carboxamide;

5-methyl-N-(2-3-((1-methylpiperazin-4-yl)oxy)-5-(trifluoromethyl)phenyl)-1H-benz[d]imidazol-5-yl)isoxazole-4-carboxamide;

N-(2-(3-fluoro-5-(trifluoromethyl)phenyl)-1H-benz[d]imidazol-5-yl)-5-methylisoxazole-4-carboxamide;

N-(2-(4-chloro-3-(trifluoromethyl)phenyl)-1H-benz[d]imidazol-5-yl)-5-methylisoxazole-4-carboxamide;

N-(2-(4-chlorophenyl)-1H-benz[d]imidazol-5-yl)-5-methylisoxazole-4-carboxamide;

N-(2-(3-((4-ethylpiperazin-1-yl)methyl)-5-(trifluoromethyl)phenyl)-1H-benz[d]imidazol-5-yl)-5-methylisoxazole-4-carboxamide;

N-(2-(4-((4-ethylpiperazin-1-yl)methyl)-3-(trifluoromethyl) phenyl)-1H-benz[d]imidazol-5-yl)-5-methylisoxazole-4-carboxamide;

N-(2-(1-acetylpiperidin-4-yl)-1H-benz[d]imidazol-5-yl)-5-methylisoxazole-4-carboxamide;

N-(2-cyclopentyl-1H-benz[d]imidazol-5-yl)-5-methylisoxazole-4-carboxamide;

5-methyl-N-(2-(3-(2-methyl-1H-imidazol-1-yl)-5-(trifluoromethyl)phenyl)-1H-benz[d]imidazol-5-yl)isoxazole-4-carboxamide;

5-methyl-N-(2-(4-morpholino-3-(trifluoromethyl)phenyl)-1H-benz[d]imidazol-4-yl)isoxazole-4-carboxamide; or 5-methyl-N-(2-(3-(4-methyl-1H-imidazol-1-yl)-5-(trifluoromethyl)phenyl)-1H-benz[d]imidazol-4-yl)isoxazole-4-carboxamide.

Further, for the compound in the present invention, as shown in the following Reaction Scheme 1, a benzimidazole derivative of claim 1 may be prepared by a method including: forming benzimidazole and an amide using a compound of Chemical Formula 4 and substituents, and then preparing a compound of Chemical Formula 6, which is a key intermediate compound, by performing a reaction in a microwave environment (Steps 1 to 3);

preparing a compound of Chemical Formula 7 by dissolving the compound of Chemical Formula 6 prepared in Steps 1 to 3 in methanol, stirring the resulting solution under hydrogen gas, followed by distillation (Step 4); and preparing a compound of Chemical Formula 1 by dissolving the compound of Chemical Formula 7 prepared in Step 4 and methylisoxazole carbonyl chloride in THF, stirring the resulting solution to terminate the reaction, and then removing the residual methylisoxazole (Step 5), and the method is not limited to this example.

ates, hydroxyalkanoates and alkanedioates, aromatic acids, aliphatic and aromatic sulfonic acids. Such pharmaceutically nontoxic salts include sulfates, pyrosulfates, bisulfates, sulfites, bisulfites, nitrates, phosphates, monohydrogen phosphates, dihydrogen phosphates, metaphosphates, pyrophosphates, chlorides, bromides, iodides, fluorides, acetates, propionates, decanoates, caprylates, acrylates, formates, isobutyrates, caprates, heptanoates, propiolates, oxalates, malonates, succinates, suberates, sebacates, fumarates, maleates, butene-1,4-dioates, hexane-1,6-dioates, benzoates, chlorobenzoates, methyl benzoates, dinitrobenzoates, hydroxybenzoates, methoxybenzoates, phthalates, terephthalates, benzenesulfonates, toluenesulfonates, chlorobenzenesulfonates, xylenesulfonates, phenyl acetates, phenyl propionates, phenyl butyrates, citrates, lactates, β-hydroxybutyrates, glycolates, malates, tartrates, methanesulfonates, propanesulfonates, naphthalene-1-sulfonates, naphthalene-2-sulfonates or mandelates.

The acid addition salt according to the present invention may be prepared by typical methods, for example, dissolving the compound in an excess aqueous acid solution, and precipitating the salt using a water-miscible organic solvent, for example, methanol, ethanol, acetone or acetonitrile. Further, the acid addition salt may also be prepared by evaporating the solvent or excess acid from this mixture, and then drying the mixture or suction-filtering a precipitated salt.

In addition, a pharmaceutically acceptable metal salt may be prepared using a base. An alkali metal or alkaline earth metal salt is obtained by, for example, dissolving the compound in an excess alkali metal hydroxide or alkaline-earth metal hydroxide solution, filtering the non-soluble compound salt, evaporating the filtrate, and drying the result product. In this case, preparing a sodium, potassium or calcium salt as the metal salt is pharmaceutically suitable. A

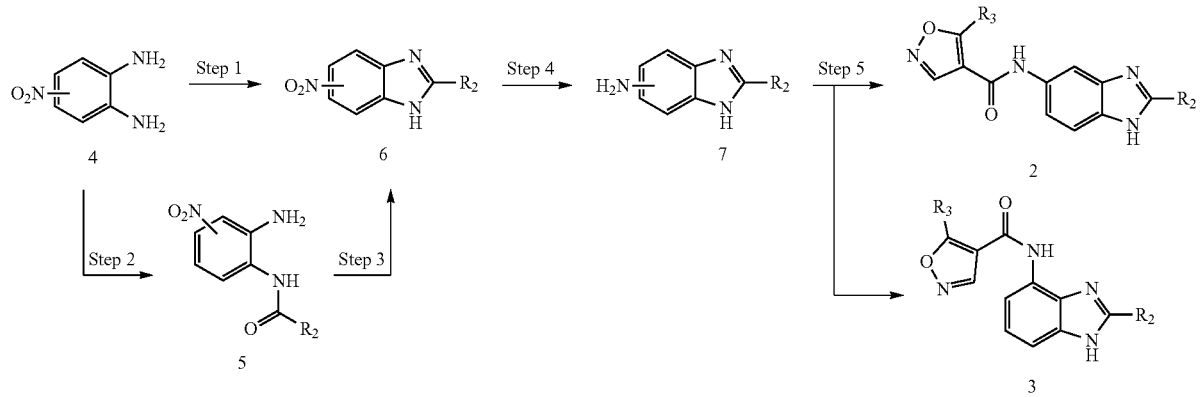

[Reaction Scheme 1]

Meanwhile, the compound of the present invention may be used in the form of a pharmaceutically acceptable salt, and as the salt, an acid addition salt formed by a pharmaceutically acceptable free acid is useful.

As the term "salt" used herein, an acid addition salt formed by a pharmaceutically acceptable free acid is useful. The acid addition salt is obtained from inorganic acids such as hydrochloric acid, nitric acid, phosphoric acid, sulfuric acid, hydrobromic acid, hydroiodic acid, nitrous acid or phosphorous acid, and nontoxic organic acids such as aliphatic mono- and dicarboxylates, phenyl-substituted alkanosilver salt corresponding to this is obtained by reacting the alkali metal or alkaline earth metal salt with a suitable silver salt (for example, silver nitrate).

Further, the compound of the present invention includes not only pharmaceutically acceptable salts, but also all salts, isomers, hydrates and solvates which can be prepared by typical methods.

As can be confirmed in the following Examples, the compound of Chemical Formula 1 may be used as a FLT3 inhibitor, and as described in the Background Art of the invention, it is well known to those skilled in the art that the FLT3 inhibitor can be used for cancer treatment.

The present invention provides a pharmaceutical composition for preventing or treating cancer, including the benzimidazole derivative of Chemical Formula 1 or a pharmaceutically acceptable salt thereof as an active ingredient, and more specifically, a pharmaceutical composition for preventing or treating acute myeloid leukemia (AML), a use of the benzimidazole derivative of Chemical Formula 1 or a pharmaceutically acceptable salt thereof for treating the disease, and a method for treating the disease, the method including: administering a therapeutically effective amount of the compound of Chemical Formula 1 or a pharmaceutically acceptable salt thereof to a subject.

As used herein, the term "prevention" or "preventing" refers to all actions that suppress acute myeloid leukemia (AML) or delay the onset of the acute myeloid leukemia (AML) by administering the pharmaceutical composition according to the present invention.

As used herein, the term "treatment" refers to all actions that ameliorate or beneficially change symptoms for acute myeloid leukemia (AML) by administering the pharmaceutical composition according to the present invention.

The pharmaceutical composition of the present invention may include a pharmaceutically acceptable carrier in addition to an active ingredient. In this case, the pharmaceutically acceptable carrier is typically used during formulation, and includes lactose, dextrose, sucrose, sorbitol, mannitol, starch, gum acacia, calcium phosphate, alginate, gelatin, calcium silicate, microcrystalline cellulose, polyvinylpyrrolidinone, cellulose, water, syrup, methylcellulose, methyl hydroxybenzoate, propyl hydroxybenzoate, talc, magnesium stearate, mineral oil, and the like, but is not limited thereto. Furthermore, the pharmaceutically acceptable carrier may further comprise a lubricant, a wetting agent, a sweetening agent, a flavoring agent, an emulsifier a suspending agent, a preservative, and the like in addition to the above ingredients.

The pharmaceutical composition of the present invention may be orally administered or may be parenterally administered (for example, applied intravenously, subcutaneously, intraperitoneally, or topically), and the dosage may vary depending on a patient's condition and body weight, severity of disease, drug form, and administration route and period according to the desired method, but the dosage may be properly selected by the person skilled in the art.

The pharmaceutical composition of the present invention is administered in a pharmaceutically effective amount. In the present invention, "pharmaceutically effective amount" means an amount sufficient to treat diseases at a reasonable benefit/risk ratio applicable to medical treatment, and an effective dosage level may be determined according to factors including the type of a patient's disease, the severity of disease, the activity of drugs, sensitivity to drugs, administration time, administration route, excretion rate, treatment period, and simultaneously used drugs, and other factors well known in the medical field. The pharmaceutical composition according to the present invention may be administered as an individual therapeutic agent or in combination with other therapeutic agents, may be administered sequentially or simultaneously with therapeutic agents in the related art, and may be administered in a single dose or multiple doses. It is important to administer the composition in a minimum amount that can obtain the maximum effect without any side effects, in consideration of all the aforementioned factors, and this amount may be easily determined by those skilled in the art.

Specifically, an effective amount of the pharmaceutical composition of the present invention may vary depending on the age, gender, condition, and body weight of a patient, the absorption of the active ingredients in the body, inactivation rate and excretion rate, disease type, and the drugs used in combination, and in general, 0.0001 to 1000 mg, preferably 0.001 to 500 mg of the pharmaceutical composition of the present invention per 1 kg of body weight may be administered daily or every other day or may be dividedly administered once to three times a day. However, since the effective amount may be increased or decreased depending on the administration route, the severity of obesity, gender, body weight, age, and the like, the dosage is not intended to limit the scope of the present invention in any way.

In the present invention, "an individual" refers to a subject in need of treatment of a disease, and more specifically, refers to a mammal such as a human or a non-human primate, a mouse, a dog, a cat, a horse, and a cow.

Hereinafter, preferred preparation examples for helping the understanding of the present invention will be suggested. However, the following examples are provided only to more easily understand the present invention, and the contents of the present invention are not limited by the following preparation examples.

PREPARATION EXAMPLE 1

N-(2-amino-3-nitrophenyl)-3-(4-methylpiperazin-1-yl)-5 (trifluoromethyl)benzamide (2a)

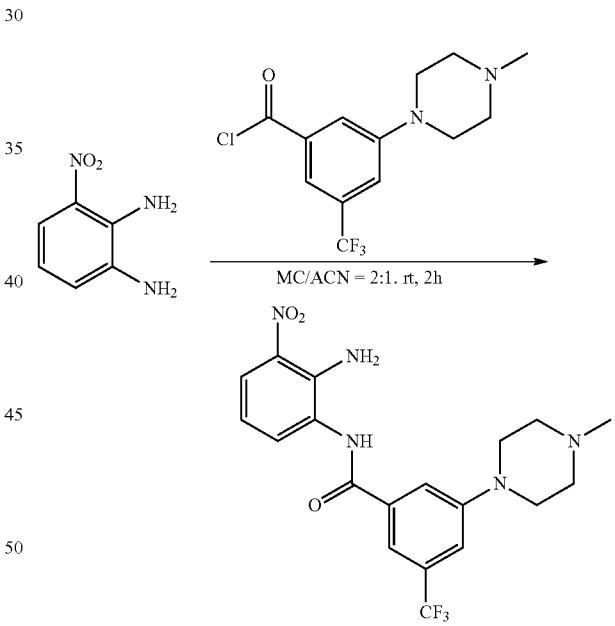

1,2,-Diamino-3-nitrobenzene (100 mg, 0.653 mmol), triethylamine (0.18 ml, 1.306 mmol), and 3-(4-methylpiperazin-1-yl)-5-(trifluoromethyl)benzoyl chloride (240.3 mg, 0.784 mmol) were stirred in $CH_2Cl_2$/acetonitrile (2/1, 4.90 ml) at room temperature for about 2 hours, an organic layer was obtained by diluting the mixed solvent with $CH_2Cl_2$ to divide a layer along with water, the remaining moisture was removed using $MgSO_4$, the resulting product was filtered, and then purified using column chromatography (MC:methanol=15:1) to obtain Compound 2a (164.6 mg, 59.53%).

$^1$H NMR (400 MHz, DMSO) δ 10.00 (s, 1H), 8.00 (dd, J=8.7, 1.5 Hz, 1H), 7.82 (s, 1H), 7.67 (s, 1H), 7.47 (dd,

J=7.4, 1.2 Hz, 1H), 7.37 (s, 1H), 7.22 (s, 2H), 6.70 (dd, J=8.7, 7.5 Hz, 1H), 3.32 (d, J=8.0 Hz, 5H), 2.49-2.44 (m, 5H), 2.24 (s, 3H); HRMS (ESI+) calculated for $C_{19}H_{20}F_3N_5O_3$ [M+H]+: 424.1518, found 424.4466.

Compounds of the following Preparation Examples 2 to 5 were obtained in the same manner as in Preparation Example 1.

PREPARATION EXAMPLE 2

N-(2-amino-3-nitrophenyl)-4-morpholino-3-(trifluoromethyl)benzamide (2b)

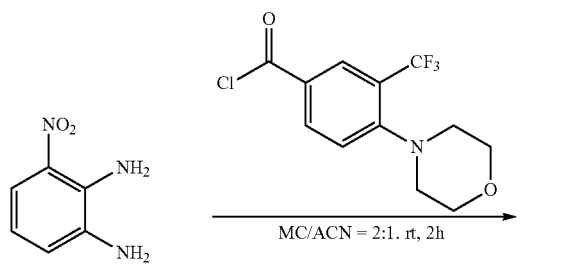

$^1$H NMR (400 MHz, DMSO) δ 10.01 (s, 1H), 8.33 (d, J=1.9 Hz, 1H), 8.28 (dd, J=8.4, 1.8 Hz, 1H), 7.99 (dd, J=8.8, 1.5 Hz, 1H), 7.66 (d, J=8.5 Hz, 1H), 7.46 (dd, J=7.4, 1.4 Hz, 1H), 7.23 (s, 2H), 6.69 (dd, J=8.7, 7.4 Hz, 1H), 3.78-3.69 (m, 4H), 3.02-2.92 (m, 4H); HRMS (ESI+) calculated for $C_{18}H_{20}F_3N_5O_3$ [M+H]+: 411.1202, found 411.2744.

PREPARATION EXAMPLE 3

N-(2-amino-3-nitrophenyl)-3-(4-methyl-1H-imidazol-1-yl)-5 (trifluoro)benzamide (2c)

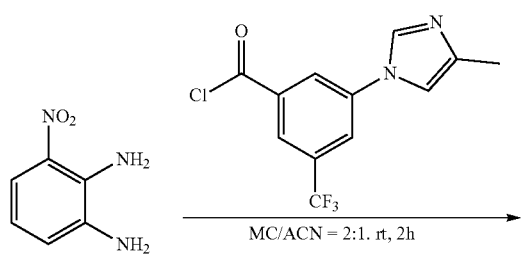

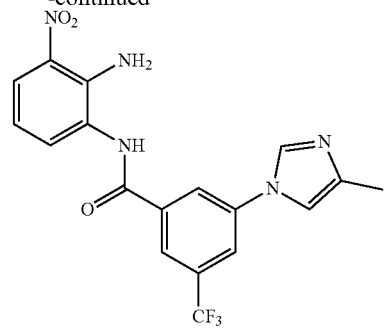

$^1$H NMR (400 MHz, DMSO) δ 10.15 (s, 1H), 8.53 (s, 1H), 8.40 (d, J=1.2 Hz, 1H), 8.27 (s, 1H), 8.22 (s, 1H), 8.02 (dd, J=8.7, 1.5 Hz, 1H), 7.71 (s, 1H), 7.52 (dd, J=7.4, 1.4 Hz, 1H), 7.31 (s, 2H), 6.72 (dd, J=8.7, 7.5 Hz, 1H), 2.19 (d, J=0.7 Hz, 3H); HRMS (ESI+) calculated for $C_{18}H_{14}F_3N_5O_3$ [M+H]+: 406.1049, found 406.2008.

PREPARATION EXAMPLE 4

1-acetyl-N-(2-amino-5-nitrophenyl)piperidine-4-carboxamide (2d)

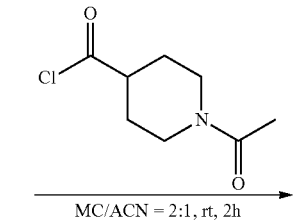

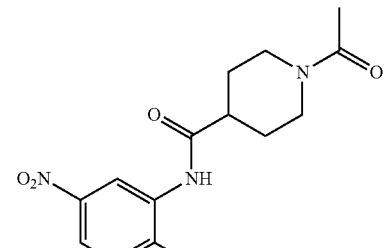

$^1$H NMR (400 MHz, DMSO) δ 9.18 (s, 1H), 8.24 (d, J=2.7 Hz, 1H), 7.84 (dd, J=9.0, 2.7 Hz, 1H), 6.76 (d, J=9.1 Hz, 1H), 6.47 (s, 2H), 4.40 (d, J=13.2 Hz, 1H), 3.87 (d, J=13.5 Hz, 1H), 3.06 (dd, J=18.3, 7.5 Hz, 1H), 2.71-2.54 (m, 2H), 2.01 (s, 3H), 1.87 (t, J=10.3 Hz, 2H), 1.60 (ddd, J=25.0, 12.4, 4.1 Hz, 1H), 1.50-1.40 (m, 1H).

PREPARATION EXAMPLE 5

N-(2-amino-5-nitrophenyl)cyclopentane carboxamide (2e)

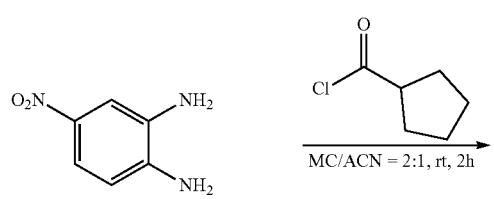

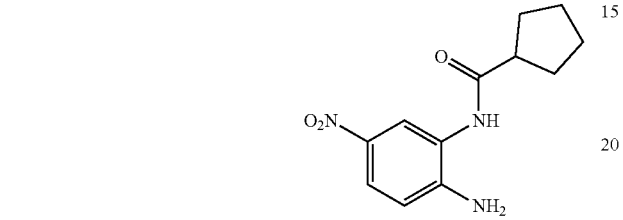

$^1$H NMR (400 MHz, DMSO) δ 9.12 (s, 1H), 8.30 (d, J=2.6 Hz, 1H), 7.83 (dd, J=9.0, 2.7 Hz, 1H), 6.76 (d, J=9.0 Hz, 1H), 6.44 (s, 2H), 2.89-2.80 (m, 1H), 1.92-1.83 (m, 2H), 1.79-1.63 (m, 4H), 1.56 (m, 2H).

PREPARATION EXAMPLE 6

2-(3-(4-methylpiperazin-1-yl)-5-(trifluoromethyl)phenyl)-5-nitro-1H-benz[d]imidazole (3a)

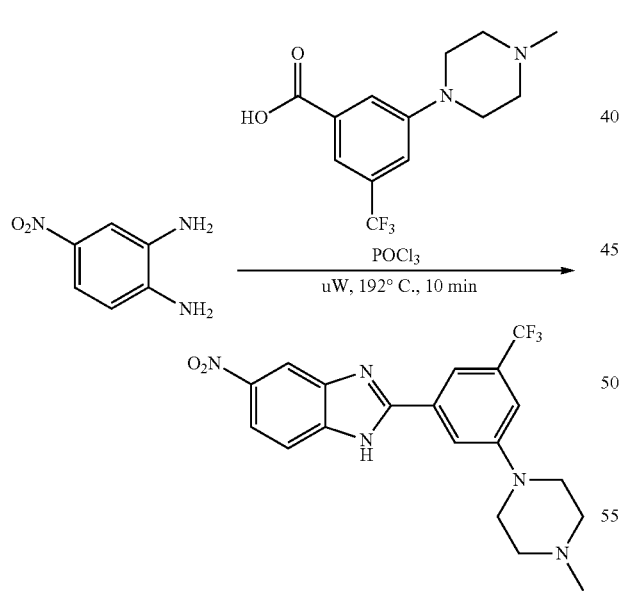

4-Nitro-1,2-phenylenediamine (200 mg, 1.31 mmol) and 3-(4-methyl-piperazin-1-yl)-5-trifluoromethyl-benzoic acid (564.72 mg, 1.96 mmol) were put into a vial, phosphorus oxychloride (1.9 ml) was slowly added dropwise thereto, and then the resulting mixture was reacted in a microwave environment at 192° C. for 10 minutes. After the reaction, the mixture was poured into ice water for precipitation, the precipitated reactant was filtered to obtain crude Compound 3a in the form of an HCl salt (529.41 mg). Then, a layer was separated under basic conditions using EA and 1M NaOH to obtain an organic layer, and then the remaining moisture was removed using MgSO$_4$, and then the resulting product was purified using column chromatography (MC:methanol=20:1) to obtain Compound 3a (334.8 mg, 63%).

$^1$H NMR (400 MHz, DMSO) δ 10.79 (s, 1H), 8.50 (s, 1H), 8.16 (s, 2H), 8.00 (s, 1H), 7.82 (s, 1H), 7.49 (s, 1H), 4.17-3.19(4H, m) 2.85 (s, 3H); HRMS (ESI+) calculated for $C_{19}H_{18}F_3N_5O_2$ [M+H]+: 406.1413, found 406.1557.

Compounds of the following Preparation Examples 7 to 18 were obtained in the same manner as in Preparation Example 6.

PREPARATION EXAMPLE 7

4-(3-(5-nitro-1H-benz[d]imidazol-2-yl)-5-(trifluoromethyl)phenyl)morpholine (3b)

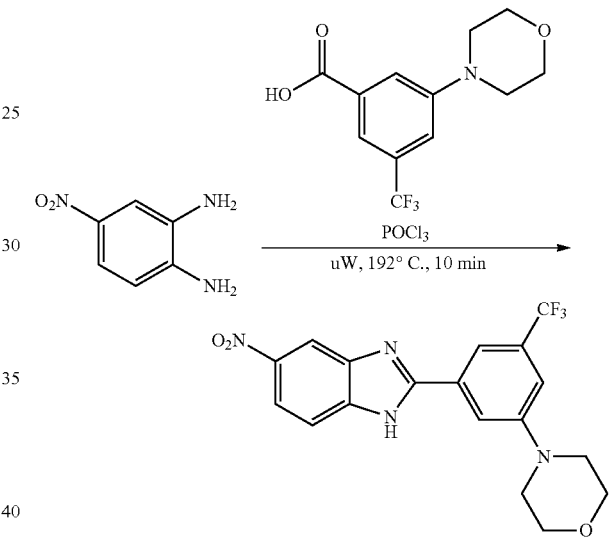

$^1$H NMR (400 MHz, DMSO) δ 13.78 (d, J=7.9 Hz, 1H), 8.57-8.41 (m, 3H), 8.16 (t, J=10.8 Hz, 1H), 7.88-7.76 (m, 2H), 3.80-3.72 (m, 4H), 3.05-2.96 (m, 4H); HRMS (ESI+) calculated for $C_{18}H_{15}F_3N_4O_3$ [M+H]+: 393.1096, found 393.0186.

PREPARATION EXAMPLE 8

4-(4-(5-nitro-1H-benz[d]imidazol-2-yl)-2-(trifluoromethyl)phenyl)morpholine (3c)

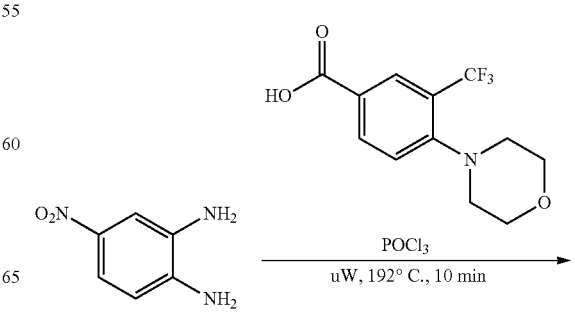

17

-continued

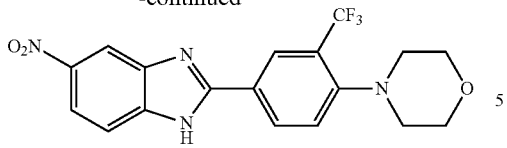

¹H NMR (400 MHz, DMSO) δ 13.78 (d, J=7.9 Hz, 1H), 8.57-8.41 (m, 3H), 8.16 (t, J=10.8 Hz, 1H), 7.88-7.76 (m, 2H), 3.80-3.72 (m, 4H), 3.05-2.96 (m, 4H); HRMS (ESI+) calculated for $C_{18}H_{15}F_3N_4O_3$ [M+H]+: 393.1096, found 393.0186.

PREPARATION EXAMPLE 9

2-(3-(4-methyl-1H-imidazol-1-yl)-5-(trifluoromethyl)phenyl)-5-nitro-1H-benz[d]imidazole (3d)

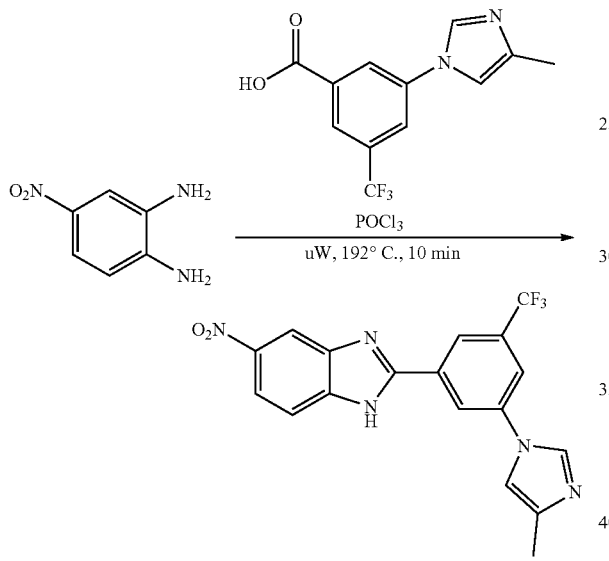

¹H NMR (400 MHz, DMSO) δ 13.86 (s, 1H), 8.62 (s, 1H), 8.52 (s, 1H), 8.41 (s, 1H), 8.39 (d, J=1.1 Hz, 1H), 8.20 (s, 1H), 8.16 (dd, J=8.9, 2.1 Hz, 1H), 7.83 (d, J=8.9 Hz, 1H), 7.68 (s, 1H), 2.20 (s, 3H); HRMS (ESI+) calculated for $C_{18}H_{12}F_3N_5O_2$ [M+H]+: 388.0943, found 388.1040.

PREPARATION EXAMPLE 10

2-(3-(5-methyl-1H-imidazol-1-yl)-5-(trifluoromethyl)phenyl)-5-nitro-1H-benz[d]imidazole (3e)

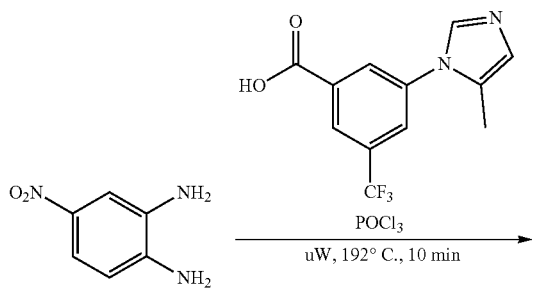

18

-continued

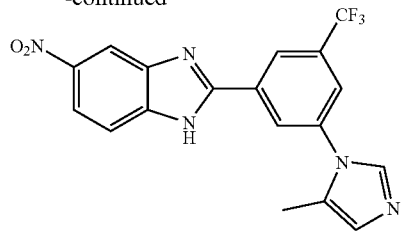

¹H NMR (400 MHz, DMSO) δ 13.94 (s, 1H), 8.63 (s, 1H), 8.56 (s, 1H), 8.51 (s, 1H), 8.18 (dd, J=8.9, 2.1 Hz, 1H), 8.13 (s, 1H), 8.00 (s, 1H), 7.86 (d, J=8.7 Hz, 1H), 6.92 (s, 1H), 2.27 (d, J=0.6 Hz, 3H); HRMS (ESI+) calculated for $C_{18}H_{15}F_3N_4O_3$ [M+H]+: 388.0943, found 388.2615.

PREPARATION EXAMPLE 11

2-(3-(2-methyl-1H-imidazol-1-yl)-5-(trifluoromethyl)phenyl)-5-nitro-1H-benz[d]imidazole (3f)

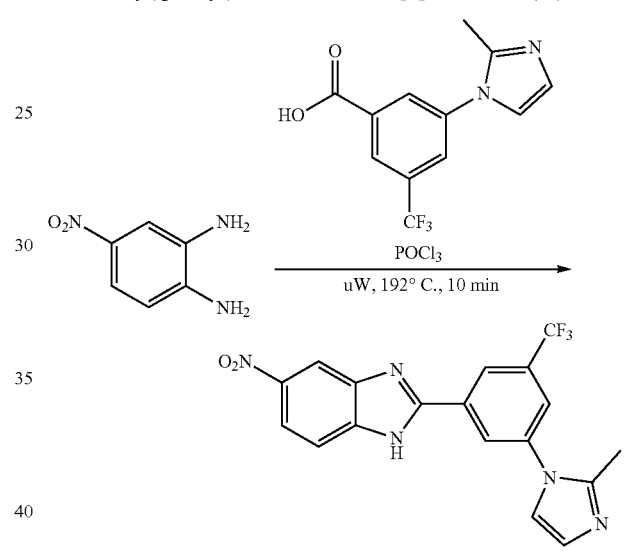

¹H NMR (400 MHz, DMSO) δ 13.95 (s, 1H), 8.62 (s, 1H), 8.52 (s, 1H), 8.19 (d, J=8.8 Hz, 1H), 8.13 (s, 1H), 7.87 (s, 1H), 7.55 (s, 1H), 7.02 (s, 1H), 2.40 (s, 3H); HRMS (ESI+) calculated for $C_{18}H_{15}F_3N_4O_3$ [M+H]+: 388.0943, found 388.1040.

PREPARATION EXAMPLE 12

2-(3-fluoro-5-(trifluoromethyl)phenyl)-5-nitro-1H-benz[d]imidazole (3h)

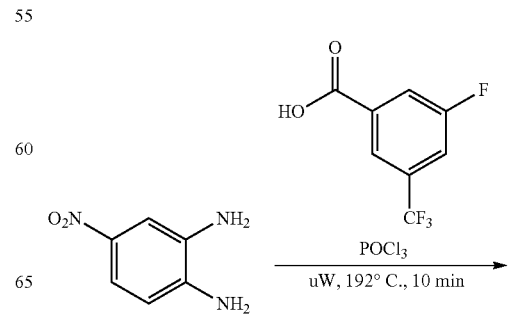

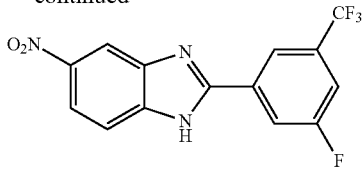

¹H NMR (400 MHz, DMSO) δ 13.92 (s, 1H), 8.55 (s, 1H), 8.42 (s, 1H), 8.32 (d, J=9.3 Hz, 1H), 8.18 (dd, J=8.9, 2.2 Hz, 1H), 7.95 (d, J=8.5 Hz, 1H), 7.85 (d, J=8.8 Hz, 1H).

PREPARATION EXAMPLE 13

2-(3-((1-methylpiperidin-4-yl)oxy)-5-(trifluoromethyl)phenyl)-5-nitro-1H-benz[d]imidazole (3i)

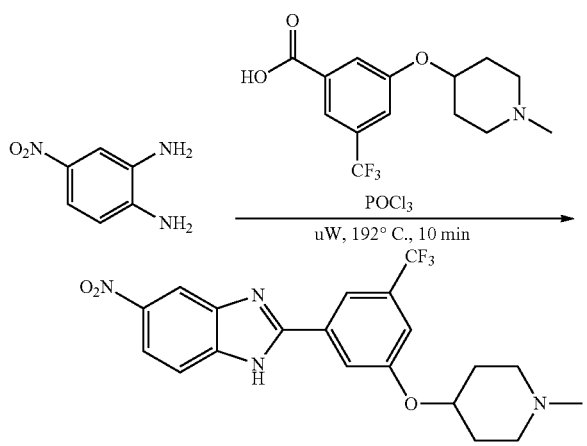

¹H NMR (400 MHz, DMSO) δ 13.55 (s, 1H), 8.53 (d, J=1.7 Hz, 1H), 8.16 (dd, J=8.9, 2.2 Hz, 1H), 8.12 (s, 1H), 8.06 (s, 1H), 7.82 (d, J=8.9 Hz, 1H), 7.48 (s, 1H), 4.73-4.66 (m, 1H), 3.17 (s, 1H), 2.72-2.63 (m, 2H), 2.33 (d, J=1.9 Hz, 2H), 2.25 (s, 3H), 2.01 (d, J=12.1 Hz, 2H), 1.80-1.69 (m, 2H).

PREPARATION EXAMPLE 14

2-(4-(4-methylpiperazin-1-yl)-3-(trifluoromethyl)phenyl)-5-nitro-1H-benz[d]imidazole (3j)

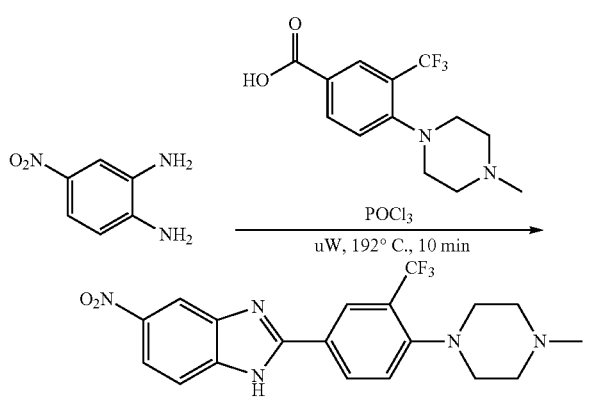

¹H NMR (400 MHz, DMSO) δ 13.74 (s, 1H), 8.51 (t, J=3.5 Hz, 2H), 8.44 (dd, J=8.5, 2.0 Hz, 1H), 8.14 (dd, J=8.9, 2.2 Hz, 1H), 7.79 (d, J=8.8 Hz, 1H), 7.70 (d, J=8.5 Hz, 1H), 3.00 (t, J=4.7 Hz, 4H), 2.51 (t, 4H), 2.25 (s, 3H).

PREPARATION EXAMPLE 15

2-(4-chloro-3-(trifluoromethyl)phenyl)-5-nitro-1H-benz[d]imidazole (3k)

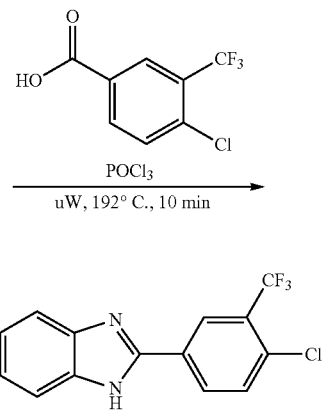

¹H NMR (400 MHz, DMSO) δ 13.91 (s, 1H), 8.66 (d, J=2.0 Hz, 1H), 8.54 (s, 1H), 8.50 (dd, J=8.4, 2.0 Hz, 1H), 8.17 (dd, J=8.9, 2.2 Hz, 1H), 8.00 (d, J=8.5 Hz, 1H), 7.83 (d, J=8.9 Hz, 1H).

PREPARATION EXAMPLE 16

2-(4-chlorophenyl)-5-nitro-1H-benz[d]imidazole (3l)

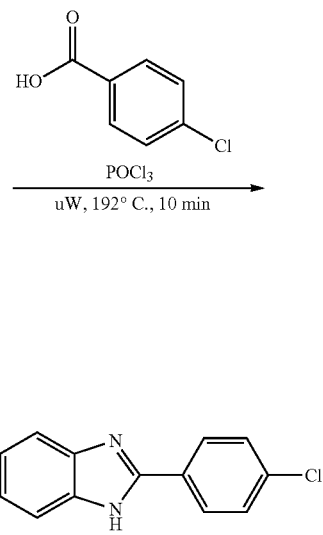

¹H NMR (400 MHz, DMSO) δ 13.69 (s, 1H), 8.49 (s, 1H), 8.26-8.20 (m, 2H), 8.15 (dd, J=8.9, 2.2 Hz, 1H), 7.78 (d, J=8.8 Hz, 1H), 7.72-7.67 (m, 2H).

PREPARATION EXAMPLE 17

2-(3-((4-ethylpiperazin-1-yl)methyl)-5-(trifluoromethyl)phenyl)-5-nitro-1H-benz[d]imidazole (3m)

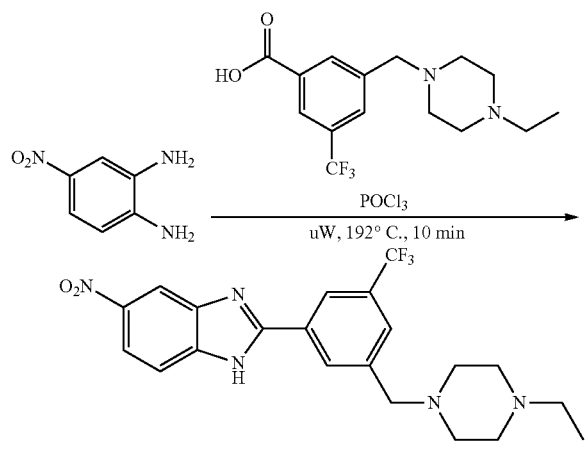

¹H NMR (400 MHz, DMSO) δ 13.86 (s, 1H), 8.55 (s, 1H), 8.48 (d, J=7.5 Hz, 2H), 8.18 (dd, J=8.9, 2.3 Hz, 1H), 7.84 (d, J=8.7 Hz, 2H), 3.70 (s, 2H), 3.31 (m, 2H), 2.50-2.32 (m, 8H), 1.01 (t, J=7.2 Hz, 3H).

PREPARATION EXAMPLE 18

2-(4-((4-ethylpiperazin-1-yl)methyl)-3-(trifluoromethyl)phenyl)-5-nitro-1H-benz[d]imidazole (3n)

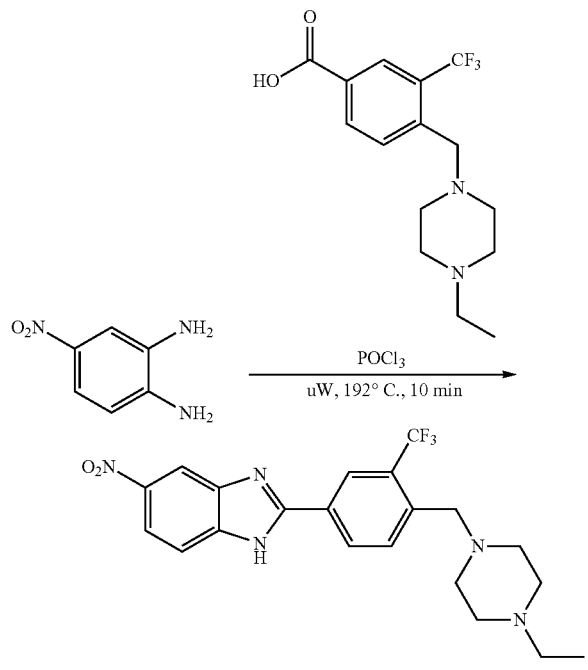

¹H NMR (400 MHz, DMSO) δ 13.84 (s, 1H), 8.55 (d, J=1.4 Hz, 1H), 8.52 (s, 1H), 8.49 (d, J=8.1 Hz, 1H), 8.16 (dd, J=8.9, 2.2 Hz, 1H), 8.00 (d, J=8.2 Hz, 1H), 7.81 (d, J=8.8 Hz, 1H), 3.70 (s, 2H), 3.29 (s, 2H), 2.47-2.30 (m, 8H), 1.00 (t, J=7.2 Hz, 3H).

PREPARATION EXAMPLE 19

2-(3-(4-methylpiperazin-1-yl)-5-(trifluoromethyl)phenyl)-4-nitro-1H-benz[d]imidazole (3o)

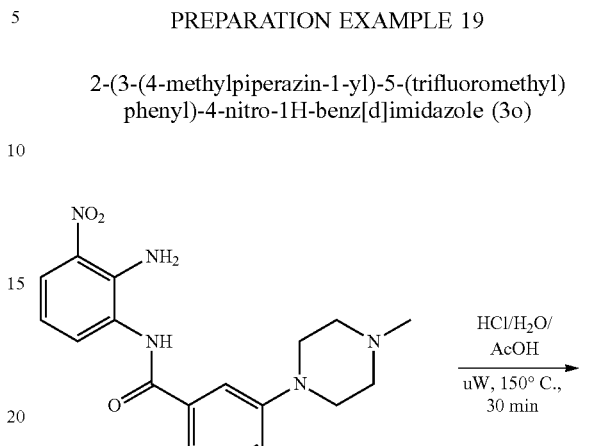

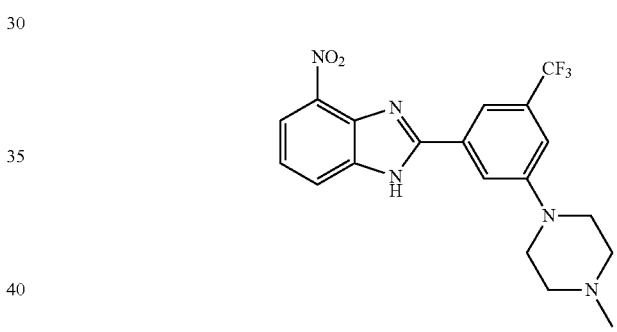

Compound 2a (100 mg, 0.236 mmol) and an aqueous concentrated HCl solution (25.19 ul) were dissolved in acetic acid (0.708 ml) and the resulting solution was reacted in a microwave environment at 150° C. for 30 minutes. After the reaction, the precipitate produced after cooling was filtered, then washed with acetic acid and ether and then dried to obtain Compound 3o (95.5 mg, 91.6%) in the form of an HCl salt.

1H NMR (400 MHz, DMSO) δ 13.40 (s, 1H), 10.73 (s, 1H), 8.29-8.14 (m, 2H), 8.05 (d, J=15.8 Hz, 1H), 7.48 (t, J=8.0 Hz, 2H), 3.53 (s, 4H), 3.25 (d, J=22.4 Hz, 4H), 2.84 (s, 3H); HRMS (ESI+) calculated for $C_{19}H_{18}F_3N_5O_2$ [M+H]+: 406.1413, found 406.1378.

Compounds of the following Preparation Examples 20 to 23 were obtained in the same manner as in Preparation Example 19.

PREPARATION EXAMPLE 20

4-(4-(4-nitro-1H-benz[d]imidazol-2-yl)-2-(trifluoromethyl)phenyl)morpholine (3p)

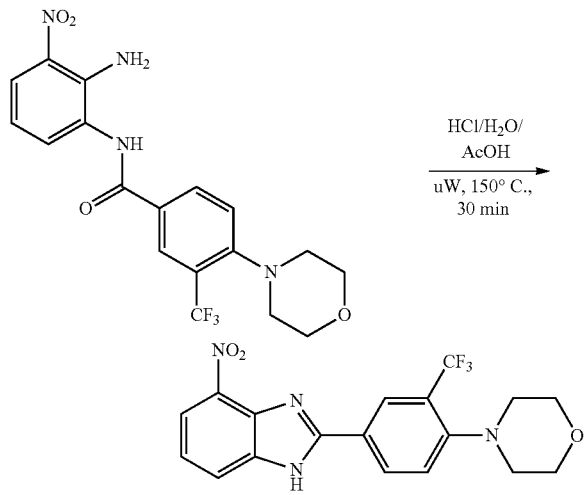

¹H NMR (400 MHz, DMSO) δ 8.73 (d, J=2.1 Hz, 1H), 8.64 (dd, J=8.5, 2.1 Hz, 1H), 8.17 (ddd, J=8.0, 5.8, 0.9 Hz, 2H), 7.72 (d, J=8.6 Hz, 1H), 7.49 (t, J=8.1 Hz, 1H), 3.81-3.72 (m, 4H), 3.08-2.95 (m, 4H); HRMS (ESI+) calculated for $C_{18}H_{15}F_3N_4O_3$ [M+H]+: 393.1096, found 393.5010.

PREPARATION EXAMPLE 21

2-(3-(4-methyl-1H-imidazol-1-yl)-5-(trifluoromethyl)phenyl)-4-nitro-1H-benz[d]imidazole (3q)

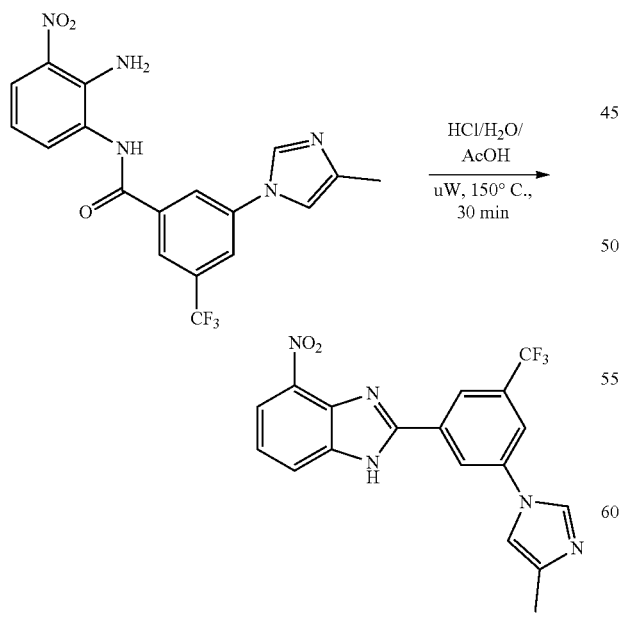

¹H NMR (400 MHz, DMSO) δ 13.49 (s, 1H), 8.90 (s, 1H), 8.66 (s, 1H), 8.44 (s, 1H), 8.22 (d, J=6.9 Hz, 3H), 7.74 (s, 1H), 7.51 (t, J=8.1 Hz, 1H), 2.22 (d, J=0.7 Hz, 3H); HRMS (ESI+) calculated for $C_{18}H_{12}F_3N_5O_2$ [M+H]+: 388.0943, found 388.1437.

PREPARATION EXAMPLE 22

1-(4-(4-nitro-1H-benz[d]imidazol-2-yl)piperidin-1-yl)ethenone (3r)

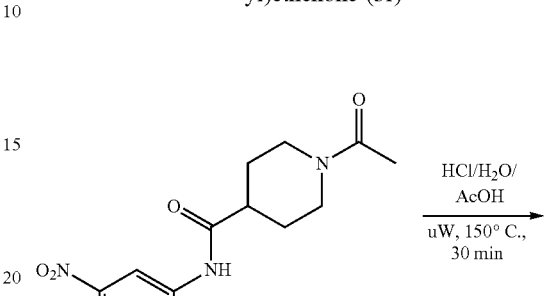

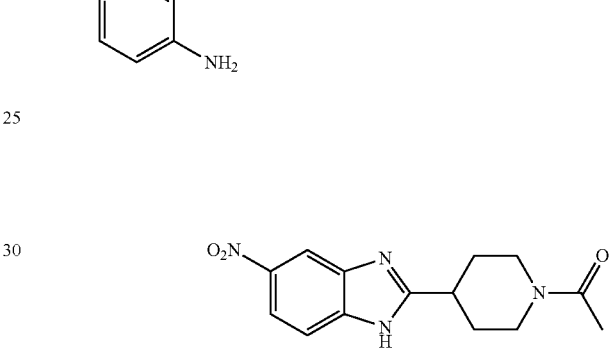

¹H NMR (400 MHz, DMSO) δ 12.94 (s, 1H), 8.40 (s, 1H), 8.08 (dd, J=8.8, 2.1 Hz, 1H), 7.67 (s, 1H), 4.39 (d, J=13.2 Hz, 1H), 3.91 (d, J=13.8 Hz, 1H), 3.23 (ddd, J=11.0, 6.8, 3.1 Hz, 2H), 2.83-2.74 (m, 1H), 2.12-1.97 (m, 5H), 1.79 (ddd, J=25.0, 11.9, 4.2 Hz, 1H), 1.71-1.60 (m, 1H).

PREPARATION EXAMPLE 23

2-cyclopentyl-4-nitro-1H-benz[d]imidazole (3s)

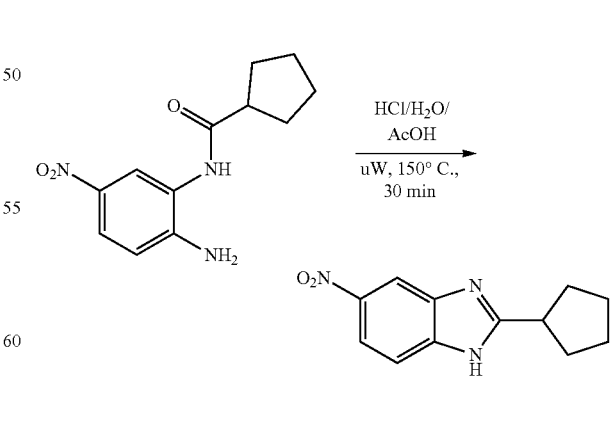

¹H NMR (400 MHz, DMSO) δ 12.86 (s, 1H), 8.35 (d, J=43.8 Hz, 1H), 8.06 (d, J=7.8 Hz, 1H), 7.64 (d, J=28.5 Hz, 1H), 3.40-3.33 (m, 1H), 2.09 (m, 2H), 1.97-1.85 (m, 2H), 1.83-1.61 (m, 4H).

PREPARATION EXAMPLE 24

2-(3-(4-methylpiperazin-1-yl)-5-(trifluoromethyl)phenyl)-1H-benz[d]imidazol-5-amine (4a)

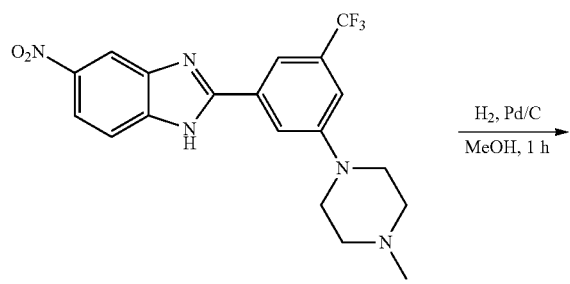

After Compound 3a (69 mg, 0.17 mmol) and Pd/C (10%, 7 mg) were dissolved in methanol (3 ml), the resulting solution was stirred at room temperature for 1 hour in the presence of hydrogen gas. After the reaction was completed, the resulting product was filtered with Celite and then distilled under reduced pressure. Compound 4a (63.8 mg, 100%) was obtained from the residue without further purification.

HRMS (ESI+) calculated for $C_{19}H_{20}F_3N_5$ [M+H]+: 376.1324, found 376.1324.

Compounds of the following Preparation Examples 25, 26, 37 and 38 were obtained in the same manner as in Preparation Example 24.

PREPARATION EXAMPLE 25

2-(3-morpholino-5-(trifluoromethyl)phenyl)-1H-benz[d]imidazol-5-amine (4b)

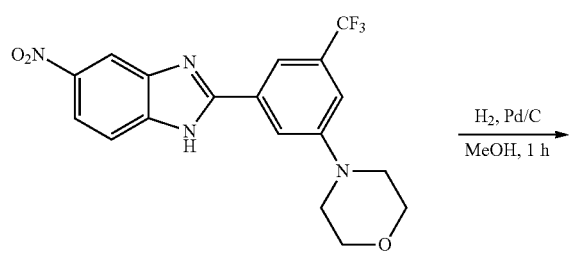

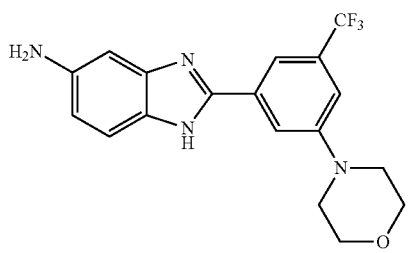

$^1$H NMR (400 MHz, DMSO) δ 12.44 (s, 1H), 7.86 (s, 1H), 7.80 (s, 1H), 7.31 (d, J=6.8 Hz, 1H), 7.22 (s, 1H), 6.66 (s, 1H), 6.55 (d, J=7.6 Hz, 1H), 5.04 (s, 2H), 3.85-3.72 (m, 4H), 3.33-3.21 (m, 4H); HRMS (ESI+) calculated for $C_{18}H_{17}F_3N_4O$ [M+H]+: 363.1354, found 363.2218.

PREPARATION EXAMPLE 26

2-(4-morpholino-3-(trifluoromethyl)phenyl)-1H-benz[d]imidazol-5-amine (4c)

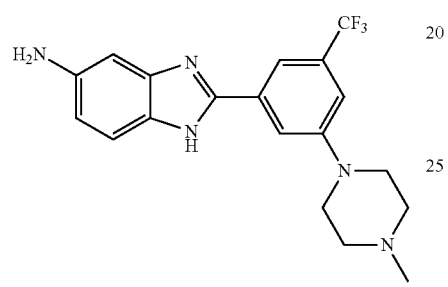

$^1$H NMR (400 MHz, DMSO) δ 12.43 (s, 1H), 8.36 (s, 1H), 8.30 (d, J=8.3 Hz, 1H), 7.67 (d, J=8.5 Hz, 1H), 7.30 (d, J=6.9 Hz, 1H), 6.67 (s, 1H), 6.54 (d, J=8.0 Hz, 1H), 5.00 (s, 2H), 3.79-3.66 (m, 4H), 2.99-2.86 (m, 4H); HRMS (ESI+) calculated for $C_{18}H_{17}F_3N_4O$ [M+H]+: 363.1354, found 363.2794.

PREPARATION EXAMPLE 27

2-(3-(4-methyl-1H-imidazol-1-yl)-5-(trifluoromethyl)phenyl)-1H-benz[d]imidazol-5-amine (4d)

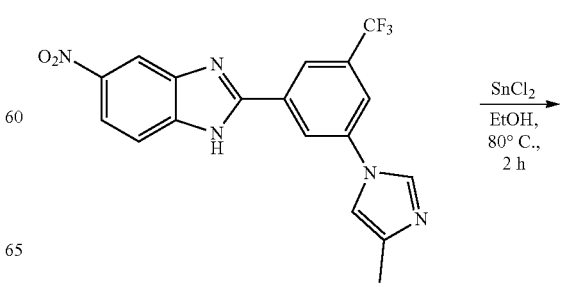

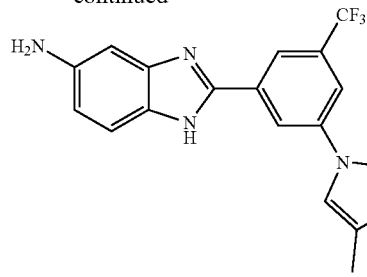

Compound 3d (60 mg, 0.16 mmol) was dissolved in ethanol (0.77 mL), $SnCl_2 \cdot 2H_2O$ (174.78 mg, 0.77 mmol) was added thereto, and then the resulting mixture was stirred at 80° C. for 2 hours. After the mixture was cooled at room temperature, the resulting product was distilled under reduced pressure to separate layers with EA under weak basic conditions using saturated aqueous sodium bicarbonate. Then, after an organic layer was obtained by again separating layers with brine, the remaining moisture was removed using magnesium sulfate, and then Compound 4d (56.16 mg, 96.88%) was obtained.

$^1$H NMR (400 MHz, DMSO) δ 8.65 (s, 1H), 8.57 (s, 1H), 8.36 (s, 1H), 8.09 (s, 1H), 7.78 (s, 1H), 7.42 (d, J=8.2 Hz, 1H), 6.87 (s, 1H), 6.71 (d, J=7.8 Hz, 1H); HRMS (ESI+) calculated for $C_{18}H_{14}F_3N_5$ [M+H]+: 358.1201, found 358.1118.

Compounds of the following Preparation Examples 28 and 29 were obtained in the same manner as in Preparation Example 27.

PREPARATION EXAMPLE 28

2-(3-(5-methyl-1H-imidazol-1-yl)-5-(trifluoromethyl)phenyl)-1H-benz[d]imidazol-5-amine (4e)

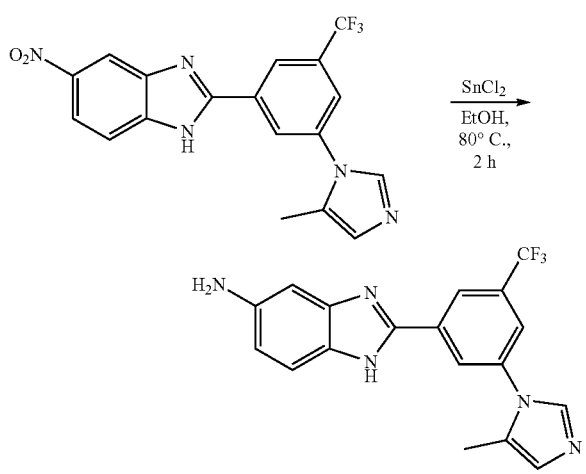

$^1$H NMR (400 MHz, DMSO) δ 12.72 (d, 1H), 8.51 (d, 1H), 8.37 (d, 1H), 8.06-7.88 (m, 2H), 7.33 (dd, 1H), 6.88 (d, 1H), 6.68 (t, 1H), 6.59 (dd, 1H), 5.16 (s, 2H), 2.27 (d, J=0.9 Hz, 3H); HRMS (ESI+) calculated for $C_{18}H_{14}F_3N_5$ [M+H]+: 358.1201, found 358.1118.

PREPARATION EXAMPLE 29

2-(3-(2-methyl-1H-imidazol-1-yl)-5-(trifluoromethyl)phenyl)-1H-benz[d]imidazol-5-amine (4f)

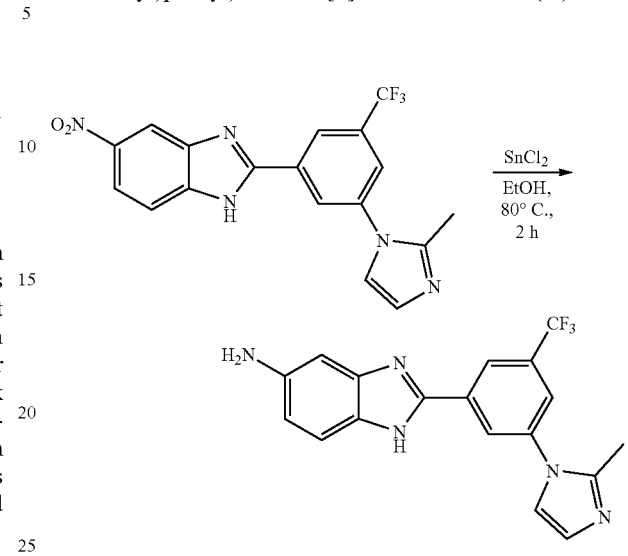

HRMS (ESI+) calculated for $C_{18}H_{14}F_3N_5$ [M+H]+: 358.1201, found 358.1433.

PREPARATION EXAMPLE 30

2-(3-fluoro-5-(trifluoromethyl)phenyl)-1H-benz[d]imidazol-5-amine (4h)

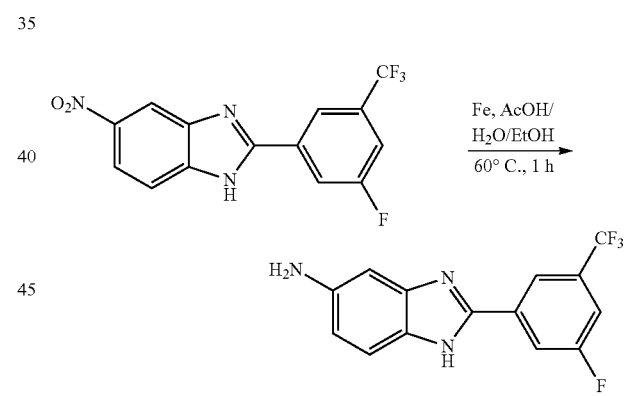

Compound 3h (50 mg, 0.13 mmol) was dissolved in EtOH/AcOH/$H_2O$ (2:2:1, 1.29 mL), Fe (36.02 mg, 0.645 mmol) was added thereto, and the resulting solution was stirred at 60° C. for 1 hour. After the solution was cooled at room temperature, the solvent was distilled under reduced pressure, then the resulting product was filtered by being allowed to pass through Celite, and then layers were separated under basic conditions using EA and 1 M Na. An organic layer was obtained, layers were again separated with brine, an organic layer was obtained, the remaining moisture was removed using magnesium sulfate, and then Compound 4h (42 mg, 91.11%) was obtained.

$^1$H NMR (400 MHz, DMSO) δ 12.77-12.56 (s, 1H), 8.30-8.25 (s, 1H), 8.18-8.13 (d, J=9.7 Hz, 1H), 7.75-7.71 (d, J=8.6 Hz, 1H), 7.35-7.25 (d, J=8.6 Hz, 1H), 6.66 (d, J=1.8 Hz, 1H), 6.81-6.57 (dd, J=8.6, 2.0 Hz, 1H), 5.11-4.85 (s, 2H).

Compounds of the following Preparation Examples 31 to 36 and 39 to 41 were obtained in the same manner as in Preparation Example 30.

PREPARATION EXAMPLE 31

2-(3-((1-methylpiperidin-4-yl)oxy)-5-(trifluoromethyl)phenyl)-1H-benz[d]imidazol-5-amine (4i)

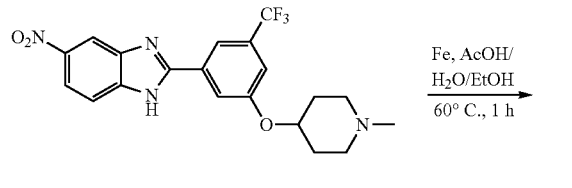

$^1$H NMR (400 MHz, DMSO) δ 12.65-12.46 (s, 1H), 8.02-7.97 (s, 1H), 7.35-7.24 (d, 1H), 7.32-7.28 (s, 1H), 6.82-6.67 (d, J=1.8 Hz, 1H), 6.64-6.57 (dd, J=8.6, 2.1 Hz, 1H), 5.07-4.81 (s, 2H), 4.64 (dd, J=7.9, 3.9 Hz, 1H), 2.70-2.63 (m, 2H), 2.36-2.27 (m, 2H), 2.22 (s, 3H), 2.00 (m, 2H), 1.72 (m, 2H).

PREPARATION EXAMPLE 32

2-(4-(4-methylpiperazin-1-yl)-3-(trifluoromethyl)phenyl)-1H-benz[d]imidazol-5-amine (4j)

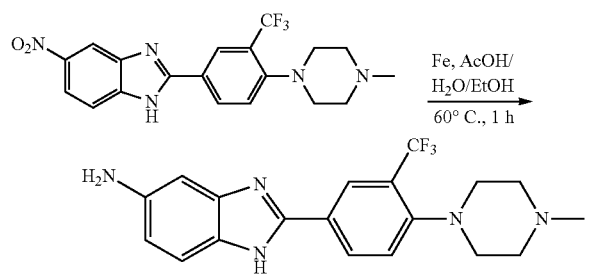

$^1$H NMR (400 MHz, DMSO) δ 12.58-12.41 (s, 1H), 8.40-8.36 (s, 1H) 8.33-8.29 (dd, J=8.4, 1.8 Hz, 1H), 7.64 (d, J=8.5 Hz, 1H), 7.32-7.22 (d, J=8.5 Hz, 1H), 6.80-6.66 (d, J=1.9 Hz, 1H), 6.61-6.54 (dd, J=8.6, 2.1 Hz, 3H), 5.02-4.78 (s, 2H), 2.95 (t, J=4.5 Hz, 4H), 2.48 (t, 4H), 2.25 (s, 3H).

PREPARATION EXAMPLE 33

2-(4-chloro-3-(trifluoromethyl)phenyl)-1H-benz[d]imidazol-5-amine (4k)

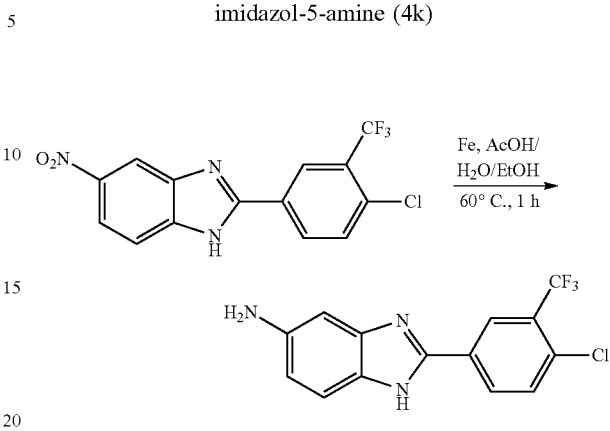

$^1$H NMR (400 MHz, DMSO) δ 12.75-12.56 (s, 1H), 8.54-8.49 (s, 1H), 8.36-8.31 (dd, J=8.5, 1.9 Hz, 1H), 7.87 (d, J=8.7 Hz, 1H), 7.34-7.24 (d, J=8.6 Hz, 1H), 6.81-6.65 (d, J=1.8 Hz, 1H), 6.63-6.56 (dd, J=8.6, 2.1 Hz, 1H), 5.08-4.82 (s, 2H).

PREPARATION EXAMPLE 34

2-(4-chlorophenyl)-1H-benz[d]imidazol-5-amine (4l)

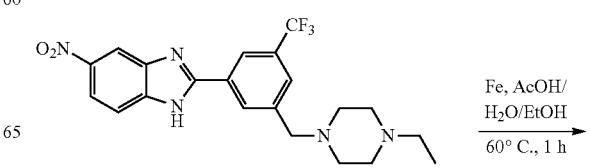

$^1$H NMR (400 MHz, DMSO) δ 12.50-12.32 (s, 1H), 8.13-8.03 (m, 2H), 7.56 (m, 2H), 7.30-7.19 (d, J=8.5 Hz, 1H), 6.78-6.64 (d, J=1.8 Hz, 1H), 6.59-6.52 (dd, J=8.5, 2.1 Hz, 1H), 5.00-4.75 (s, 2H).

PREPARATION EXAMPLE 35

2-(3-((4-ethylpiperazin-1-yl)methyl)-5-(trifluoromethyl)phenyl)-1H-benz[d]imidazol-5-amine (4m)

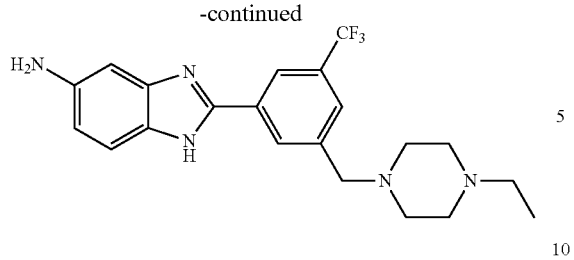

¹H NMR (400 MHz, DMSO) δ 12.71-12.52 (s, 3H), 8.34-8.30 (m, 2H), 7.69-7.65 (s, 1H), 7.35-7.24 (d, J=8.5 Hz, 1H), 6.83-6.68 (d, J=1.8 Hz, 1H), 6.64-6.57 (dd, J=8.6, 2.0 Hz, 1H), 5.07-4.81 (s, 1H), 3.63 (s, 2H), 3.32 (m, 2H), 2.49-2.29 (m, 8H), 0.99 (t, J=7.2 Hz, 3H).

PREPARATION EXAMPLE 36

2-(4-((4-ethylpiperazin-1-yl)methyl)-3-(trifluoromethyl)phenyl)-1H-benz[d]imidazol-5-amine (4n)

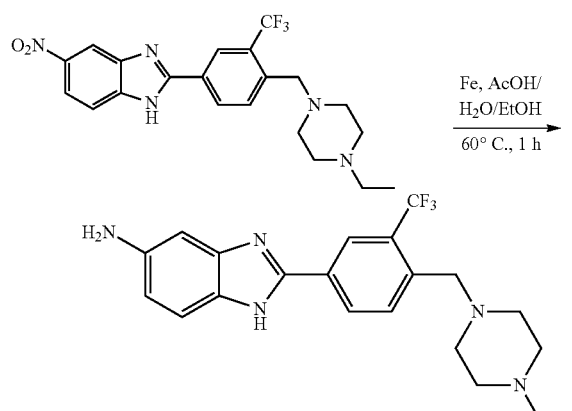

¹H NMR (400 MHz, DMSO) δ 12.65-12.47 (s, 1H), 8.41-8.37 (s, 1H), 8.33-8.29 (d, J=8.1 Hz, 1H), 7.87(m, 1H), 7.32-7.22 (d, J=8.4 Hz, 1H), 6.80-6.65 (d, J=1.8 Hz, 3H), 6.61-6.54 (dd, J=8.6, 2.1 Hz, 1H), 5.03-4.78 (s, 2H), 3.64 (s, 2H), 3.30 (m, 2H), 2.34 (m, 8H), 0.98 (t, 3H).

PREPARATION EXAMPLE 37

2-(3-(4-methylpiperazin-1-yl)-5-(trifluoromethyl)phenyl)-1H-benz[d]imidazol-4-amine (4o)

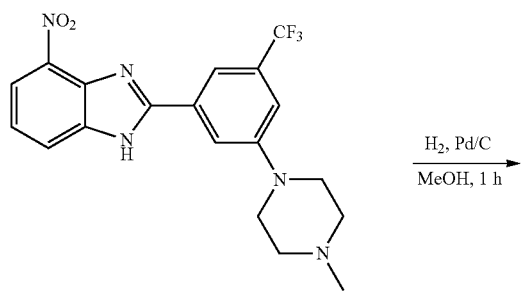

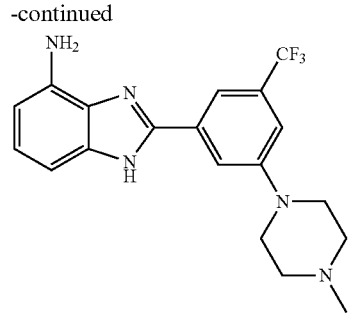

¹H NMR (400 MHz, DMSO) δ 12.99-12.77 (s, 1H), 7.92 (d, J=25.1 Hz, 2H), 7.62 (dd, J=8.1, 5.7 Hz, 1H), 7.27 (s, 1H), 6.92 (t, J=7.7 Hz, 1H), 6.71 (d, J=7.5 Hz, 1H), 6.36 (d, J=7.3 Hz, 1H), 5.34 (s, 2H), 3.45 (s, 4H), 2.78 (s, 4H), 2.44 (s, 3H); HRMS (ESI+) calculated for $C_{19}H_{20}F_3N_5$ [M+H]+: 376.1671, found 376.1684.

PREPARATION EXAMPLE 38

2-(4-morpholino-3-(trifluoromethyl)phenyl)-1H-benz[d]imidazol-4-amine (4p)

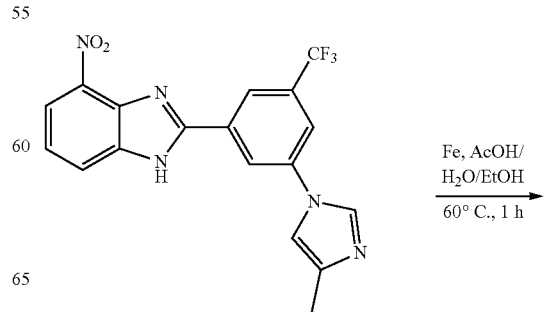

HRMS (ESI+) calculated for $C_{18}H_{17}F_3N_4O$ [M+H]+: 363.1354, found 363.4681.

PREPARATION EXAMPLE 39

2-(3-(4-methyl-1H-imidazol-1-yl)-5-(trifluoromethyl)phenyl)-1H-benz[d]imidazol-4-amine (4q)

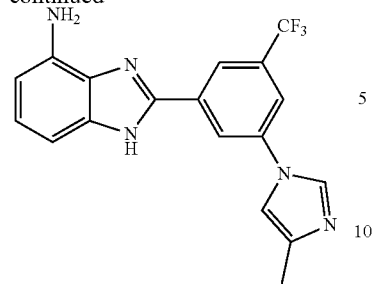

¹H NMR (400 MHz, DMSO) δ 12.85-12.68 (s, 1H), 8.58-8.54 (s, 1H), 8.41 (s, 1H), 8.37-8.31 (s, 1H), 8.12-8.09 (s, 1H), 7.71-7.66 (s, 1H), 6.97 (t, J=7.8 Hz, 1H), 6.75 (d, J=7.9 Hz, 1H), 6.52-6.39 (m, J=7.6 Hz, 1H), 5.43-5.20 (s, 1H), 2.21 (s, 3H); HRMS (ESI+) calculated for $C_{18}H_{14}F_3N_5$ [M+H]+: 358.1201, found 358.4258.

PREPARATION EXAMPLE 40

1-(4-(5-amino-1H-benz[d]imidazol-2-yl)piperidin-1-yl)ethenone (4r)

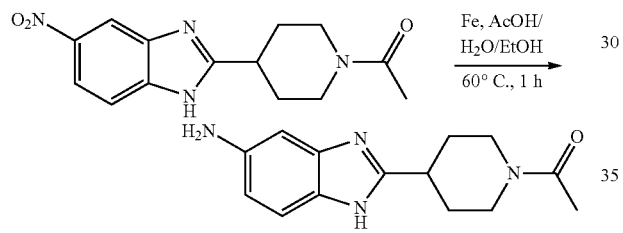

¹H NMR (400 MHz, DMSO) δ 11.70-11.59 (s, 1H), 7.17-7.08 (d, 1H), 6.70-6.57 (s, 1H), 6.48-6.45 (dd, J=7.2 Hz, 1H), 4.79 (s, 2H), 4.37 (d, J=12.9 Hz, 1H), 3.88 (d, J=13.8 Hz, 1H), 3.19 (dd, J=18.2, 7.2 Hz, 1H), 3.01 (t, J=10.9 Hz, 1H), 2.76 (t, J=12.6 Hz, 1H), 2.04 (s, 3H), 2.02-1.92 (m, 2H), 1.80-1.54 (m, 2H).

PREPARATION EXAMPLE 41

2-cyclopentyl-1H-benz[d]imidazol-5-amine (4s)

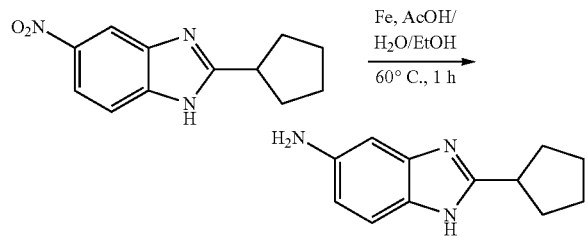

¹H NMR (400 MHz, DMSO) δ 11.58-11.47 (s, 1H), 7.13-7.04 (d, 1H), 6.67-6.54 (s, 1H), 6.40 (d, J=8.7 Hz, 1H), 4.73-4.55 (s, 2H), 3.14 (p, J=8.1 Hz, 1H), 2.04-1.94 (m, 2H), 1.88-1.77 (m, 2H), 1.77-1.67 (m, 2H), 1.67-1.56 (m, 2H).

PREPARATION EXAMPLE 42

5-methylisoxazole-4-carbonyl chloride

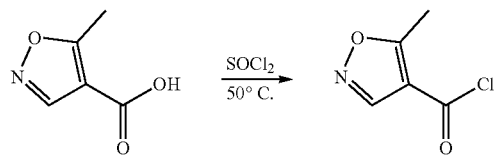

5-Methylisoxazole-4-carboxylic acid (1 g, 7.86 mmol) was dissolved in $SOCl_2$ (3 mL), and the resulting solution was stirred at 50° C. After the reaction was completed, the resulting product was cooled at room temperature, and then distilled under reduced pressure to obtain 5-methylisoxazole-4-carbonyl chloride (1098 mg, 96%).

¹H NMR (400 MHz, DMSO) δ8.77 (1H, s), 2.64 (3H, s).

EXAMPLE 1

5-methyl-N-(2-(3-(4-methylpiperazin-1-yl)-5-(trifluoromethyl)phenyl)-1H-benz[d]imidazol-5-yl)isoxazole-4-carboxamide (5a)

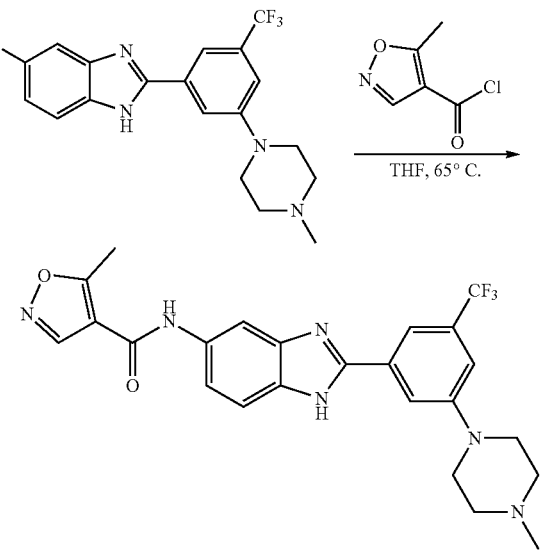

5-Methylisoxazole-4-carbonyl chloride (32.45 mg, 0.26 mmol) and Compound 4a (63.85 mg, 0.17 mmol) were dissolved in THF (1.7 ml), and the resulting solution was stirred at 65° C. After the reaction was completed due to complete consumption of Compound 3a, the resulting product was cooled at room temperature and distilled under reduced pressure. After excess methyl isoxazole was removed by separating layers under weak basic conditions using EA and saturated aqueous sodium bicarbonate, excess moisture was removed using $MgSO_4$. The resulting product was purified through column chromatography (MC:methanol=10:1) to obtain final Compound 5a (3.5 mg, 2.8%).

¹H NMR (400 MHz, MeOD) δ 8.77 (s, 1H), 8.04 (s, 1H), 7.83 (s, 1H), 7.73 (s, 1H), 7.50 (s, 1H), 7.33 (s, 1H), 7.22 (s, 1H), 3.37-3.31 (m, 4H), 2.65 (m, 4H), 2.62 (s, 3H), 2.33 (s, 3H); ¹³C NMR (101 MHz, DMSO) δ 171.11 (s), 166.88 (s), 161.33, 155.62, 150.92, 141.10, 138.86, 132.69, 126.00, 125.72, 123.29, 116.39, 116.37, 116.35, 114.33, 114.29, 113.57, 113.56, 77.64, 52.85, 45.83, 27.56; HRMS (ESI+) calculated for $C_{24}H_{23}F_3N_6O_2$ [M+H]+: 485.1835, found 485.1334.

Compounds of the following Examples 2 to 18 were obtained in the same manner as in Example 1.

EXAMPLE 2

5-methyl-N-(2-(3-morpholino-5-(trifluoromethyl)phenyl)-1H-benz[d]imidazol-5-yl)isoxazole-4-carboxamide (5b)

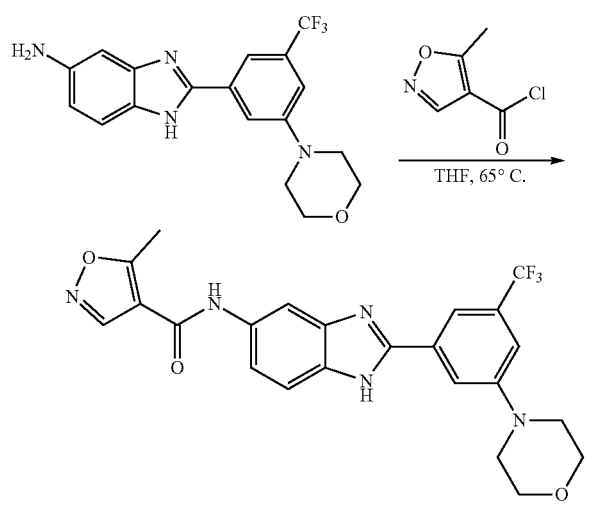

$^1$H NMR (400 MHz, DMSO) δ 13.05 (s, 1H), 10.12 (s, 1H), 9.10 (s, 1H), 8.11 (s, 1H), 7.95 (s, 1H), 7.88 (s, 1H), 7.62 (d, J=8.6 Hz, 1H), 7.45 (d, J=8.3 Hz, 1H), 7.31 (s, 1H), 3.87-3.75 (m, 4H), 3.34-3.27 (m, 4H), 2.71 (s, 3H); $^{13}$C NMR (101 MHz, DMSO) δ 172.52, 159.04, 151.81, 150.83, 150.50, 150.49, 149.10, 131.71, 130.87, 130.55, 125.56, 122.85, 115.29, 112.60, 112.56, 112.16, 111.76, 65.87, 47.68, 12.12; HRMS (ESI+) calculated for $C_{24}H_{23}F_3N_6O_2$ [M+H]+: 472.1518, found 472.3238.

EXAMPLE 3

5-methyl-N-(2-(4-morpholino-3-(trifluoromethyl)phenyl)-1H-benz[d]imidazol-5-yl)isoxazole-4-carboxamide (5c)

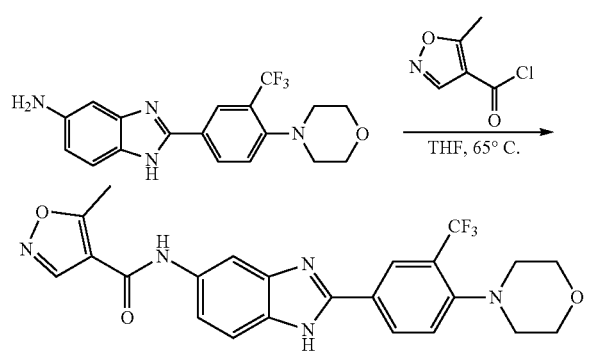

$^1$H NMR (400 MHz, DMSO) δ 13.05 (s, 1H), 10.11 (s, 1H), 9.10 (s, 1H), 8.46 (d, J=1.9 Hz, 1H), 8.40 (dd, J=8.4, 1.8 Hz, 1H), 8.10 (s, 1H), 7.71 (d, J=8.5 Hz, 1H), 7.60 (d, J=8.6 Hz, 1H), 7.43 (d, J=8.1 Hz, 1H), 3.78-3.68 (m, 4H), 3.00-2.89 (m, 4H), 2.71 (s, 3H); $^{13}$C NMR (101 MHz, DMSO) δ 172.52, 159.01, 152.75, 152.74, 150.05, 149.08, 131.08, 126.53, 125.62, 125.34, 125.29, 125.11, 125.05, 125.00, 124.86, 122.57, 112.15, 109.63, 66.48, 53.19, 12.11; HRMS (ESI+) calculated for $C_{23}H_{20}F_3N_5O_3$ [M+H]+: 472.1518, found 472.3238.

EXAMPLE 4

5-methyl-N-(2-(3-(4-methyl-1H-imidazol-1-yl)-5-(trifluoromethyl)phenyl)-1H-benz[d]imidazol-5-yl)isoxazole-4-carboxamide (5d)

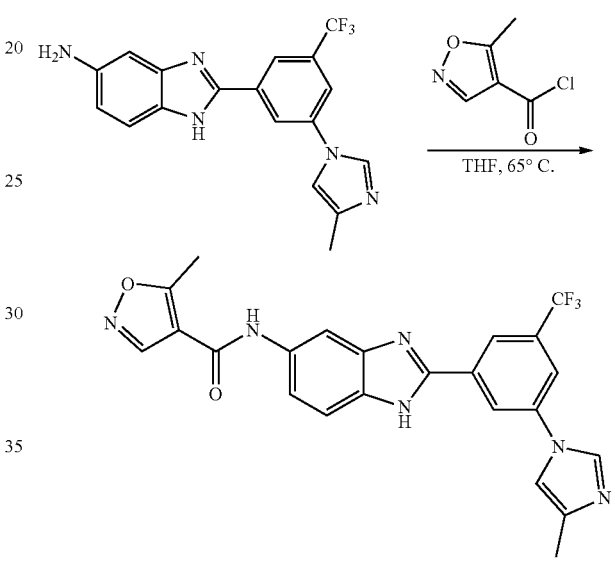

$^1$H NMR (400 MHz, DMSO) δ 13.25 (s, 1H), 10.16 (s, 1H), 9.12 (s, 1H), 8.64 (s, 1H), 8.51 (s, 1H), 8.41 (s, 1H), 8.16-8.15 (m, 2H), 7.76 (s, 1H), 7.72-7.58 (m, 1H), 7.50 (s, 1H), 2.71 (s, 3H), 2.21 (s, 3H); $^{13}$C NMR (101 MHz, DMSO) δ 173.08, 163.41, 159.60, 149.62, 144.22, 138.51, 135.59, 135.55, 133.32, 132.44, 132.10, 131.77, 125.35, 121.70, 121.14, 121.08, 118.04, 118.02, 115.28, 115.23, 112.64, 13.51, 12.64; HRMS (ESI+) calculated for $C_{23}H_{17}F_3N_6O_2$ [M+H]+: 467.1365, found 467.1456.

EXAMPLE 5

5-methyl-N-(2-(3-(5-methyl-1H-imidazol-1-yl)-5-(trifluoromethyl)phenyl)-1H-benz[d]imidazol-5-yl)isoxazole-4-carboxamide (5e)

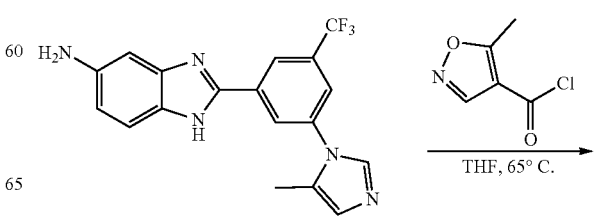

-continued

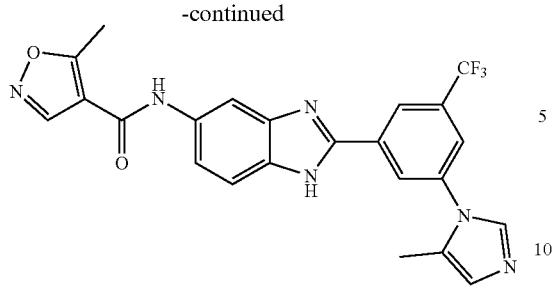

¹H NMR (400 MHz, DMSO) δ 13.25 (s, 1H), 10.15 (s, 1H), 9.11 (s, 1H), 8.57 (s, 1H), 8.44 (s, 1H), 8.17 (s, 1H), 8.03 (s, 1H), 7.65 (dd, J=41.3, 6.3 Hz, 1H), 7.49 (dd, J=36.0, 9.0 Hz, 1H), 6.95 (s, 1H), 2.70 (s, 3H), 2.27 (s, 3H); ¹³C NMR (101 MHz, DMSO) δ 173.11, 163.82, 159.62, 149.58, 142.05, 139.66, 138.93, 135.58, 135.23, 133.12, 128.14, 127.09, 124.02, 123.39, 122.73, 122.55, 119.62, 116.37, 115.57, 112.62, 112.21, 12.62, 10.03; HRMS (ESI+) calculated for $C_{23}H_{17}F_3N_6O_2$ [M+H]+: 467.1365, found 467.1456.

EXAMPLE 6

5-methyl-N-(2-(3-(2-methyl-1H-imidazol-1-yl)-5-(trifluoromethyl)phenyl)-1H-benz[d]imidazol-5-yl)isoxazol-4-carboxamide (5f)

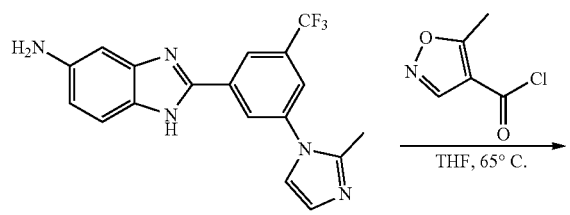

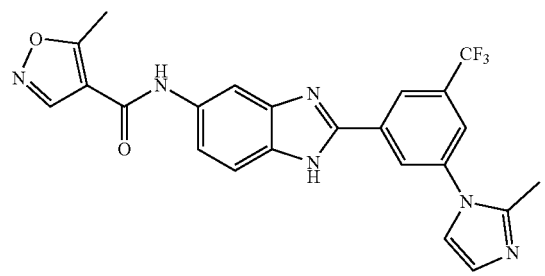

¹H NMR (400 MHz, DMSO) δ 13.24 (s, 1H), 10.14 (s, 1H), 9.11 (s, 1H), 8.56 (s, 1H), 8.45 (s, 1H), 8.18-8.11 (s, 1H), 8.02 (s, 1H), 7.72-7.44 (m, 3H), 7.01 (s, 1H), 2.71 (s, 3H), 2.40 (s, 3H); ¹³C NMR (101 MHz, DMSO) δ 173.09, 163.14, 159.60, 149.60, 139.17, 138.87, 135.65, 133.15, 132.18, 132.14, 131.81, 131.49, 127.17, 126.90, 125.26, 123.43, 122.66, 122.54, 121.88, 119.70, 112.63, 13.77, 12.63; HRMS (ESI+) calculated for $C_{23}H_{17}F_3N_6O_2$ [M+H]+: 467.1365, found 467.1456.

EXAMPLE 7

N-(2-(3-fluoro-5-(trifluoromethyl)phenyl)-1H-benz[d]imidazol-5-yl)-5-methylisoxazole-4-carboxamide (5h)

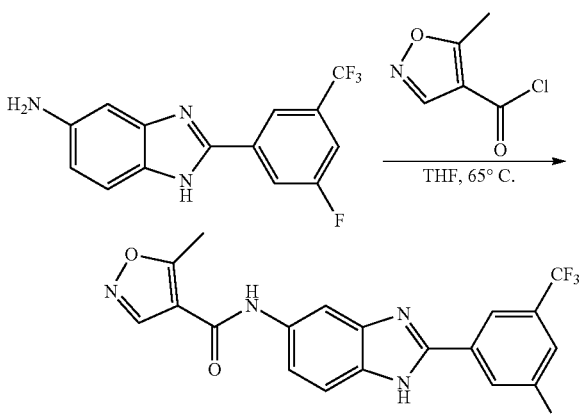

¹H NMR (400 MHz, DMSO) δ 13.16 (s, 1H), 10.11 (s, 1H), 9.10 (s, 1H), 8.35 (s, 1H), 8.23 (d, J=9.4 Hz, 1H), 8.14 (s, 1H), 7.79 (d, J=8.5 Hz, 1H), 7.64 (d, J=8.3 Hz, 1H), 7.47 (d, J=8.1 Hz, 1H), 2.71 (s, 3H).

EXAMPLE 8

5-methyl-N-(2-(3-((1-methylpiperidin-4-yl)oxy)-5-(trifluoromethyl)phenyl)-1H-benz[d]imidazol-5-yl)isoxazole-4-carboxamide (5i)

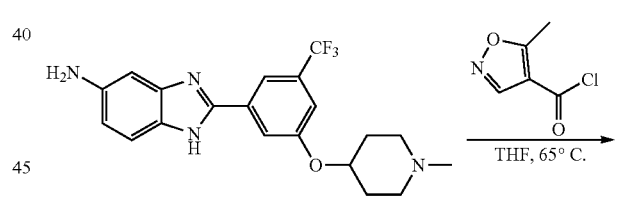

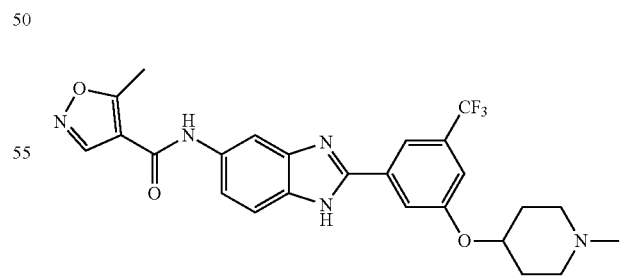

¹H NMR (400 MHz, DMSO) δ 13.10-13.04 (s, 1H), 10.13-10.07 (s, 1H), 9.10 (s, 1H), 8.24-8.14 (d, J=1.7 Hz, 1H), 8.08-8.01 (s, 1H), 8.05-7.95 (s, 1H), 7.66-7.55 (d, J=8.7 Hz, 1H), 7.51-7.41 (dd, J=8.8, 2.0 Hz, 1H), 7.38 (s, 1H), 4.68 (m, 1H), 2.71 (s, 3H), 2.70-2.62 (m, 2H), 2.33 (m, 2H), 2.25 (s, 3H), 2.00 (m, 2H), 1.74 (m, 2H).

EXAMPLE 9

5-methyl-N-(2-(4-(4-methylpiperazin-1-yl)-3-(trifluoromethyl)phenyl)-1H-benz[d]imidazol-5-yl)isoxazole-4-carboxamide (5j)

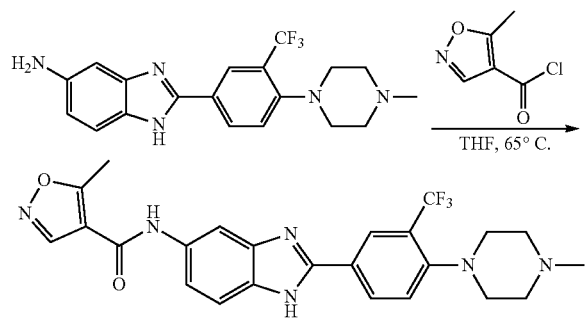

¹H NMR (400 MHz, DMSO) δ 12.97-12.14 (s, 1H), 10.06 (s, 1H), 9.07 (s, 1H), 8.41 (s, 1H), 8.38-8.28 (m, 1H), 8.07 (s, 1H), 7.62 (d, J=8.6 Hz, 1H), 7.49 (d, 2H), 2.92 (t, J=3.9 Hz, 4H), 2.67 (s, 3H), 2.46 (t, 4H), 2.24 (s, 3H).

EXAMPLE 10

N-(2-(4-chloro-3-(trifluoromethyl)phenyl)-1H-benz[d]imidazol-5-yl)-5-methylisoxazole-4-carboxamide (5k)

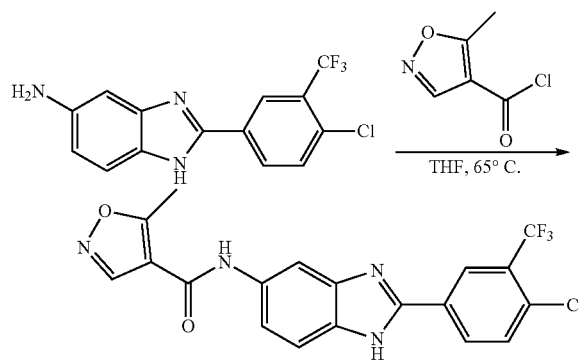

¹H NMR (400 MHz, DMSO) δ 13.15 (s, 1H), 10.10 (s, 1H), 9.10 (s, 1H), 8.58 (s, 1H), 8.41 (d, J=8.2 Hz, 1H), 8.13 (s, 1H), 7.89 (d, J=8.4 Hz, 1H), 7.62 (s, 1H), 7.46 (s, 1H), 2.71 (s, 3H).

EXAMPLE 11

N-(2-(4-chlorophenyl)-1H-benz[d]imidazol-5-yl)-5-methylisoxazole-4-carboxamide (5l)

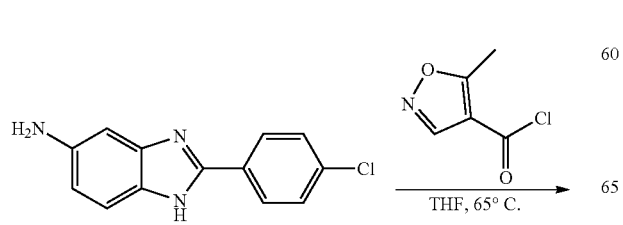

-continued

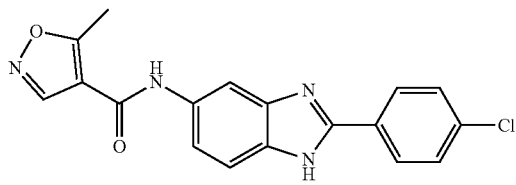

¹H NMR (400 MHz, DMSO) δ 12.94 (s, 1H), 10.12 (s, 1H), 9.12 (s, 1H), 8.17 (d, J=7.8 Hz, 2H), 8.13 (s, 1H), 7.54 (m, 4H), 2.71 (s, 3H).

EXAMPLE 12

N-(2-(3-((4-ethylpiperazin-1-yl)methyl)-5-(trifluoromethyl)phenyl)-1H-benz[d]imidazol-5-yl)-5-methylisoxazole-4-carboxamide (5m)

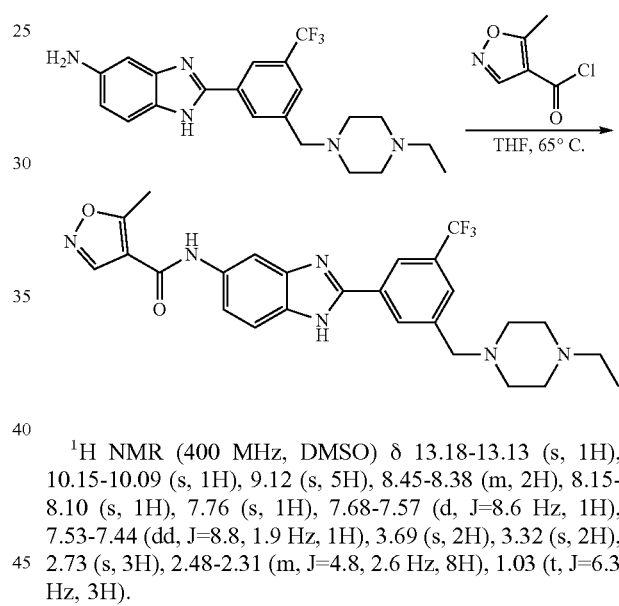

¹H NMR (400 MHz, DMSO) δ 13.18-13.13 (s, 1H), 10.15-10.09 (s, 1H), 9.12 (s, 5H), 8.45-8.38 (m, 2H), 8.15-8.10 (s, 1H), 7.76 (s, 1H), 7.68-7.57 (d, J=8.6 Hz, 1H), 7.53-7.44 (dd, J=8.8, 1.9 Hz, 1H), 3.69 (s, 2H), 3.32 (s, 2H), 2.73 (s, 3H), 2.48-2.31 (m, J=4.8, 2.6 Hz, 8H), 1.03 (t, J=6.3 Hz, 3H).

EXAMPLE 13

N-(2-(4-((4-ethylpiperazin-1-yl)methyl)-3-(trifluoromethyl)phenyl)-1H-benz[d]imidazol-5-yl)-5-methylisoxazole-4-carboxamide (5n)

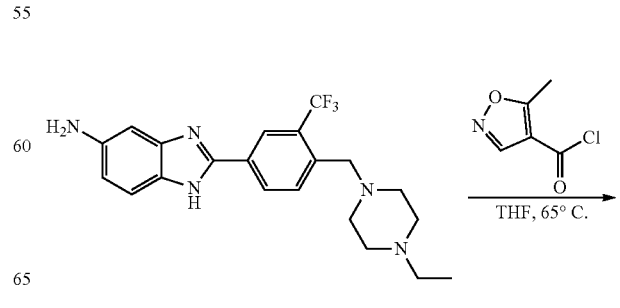

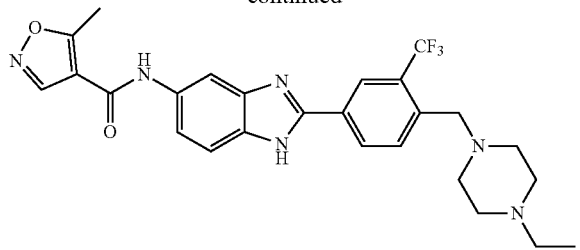

¹H NMR (400 MHz, DMSO) δ 13.12-13.07 (s, 1H), 10.12-10.06 (s, 1H), 9.10 (s, 1H), 8.49-8.46 (s, 1H), 8.42-8.39 (d, J=8.4 Hz, 1H), 8.14-8.07 (s, 1H), 7.94 (d, J=8.2 Hz, 1H), 7.66-7.53 (d, 1H), 7.51-7.40 (dd, J=8.7, 1.8 Hz, 1H), 3.68 (s, 2H), 3.31-3.28 (m, 2H), 2.71 (s, 3H), 2.33 (s, 8H), 1.01 (t, J=6.9 Hz, 3H).

EXAMPLE 14

N-(2-(1-acetylpiperidin-4-yl)-1H-benz[d]imidazol-5-yl)-5-methylisoxazole-4-carboxamide (5o)

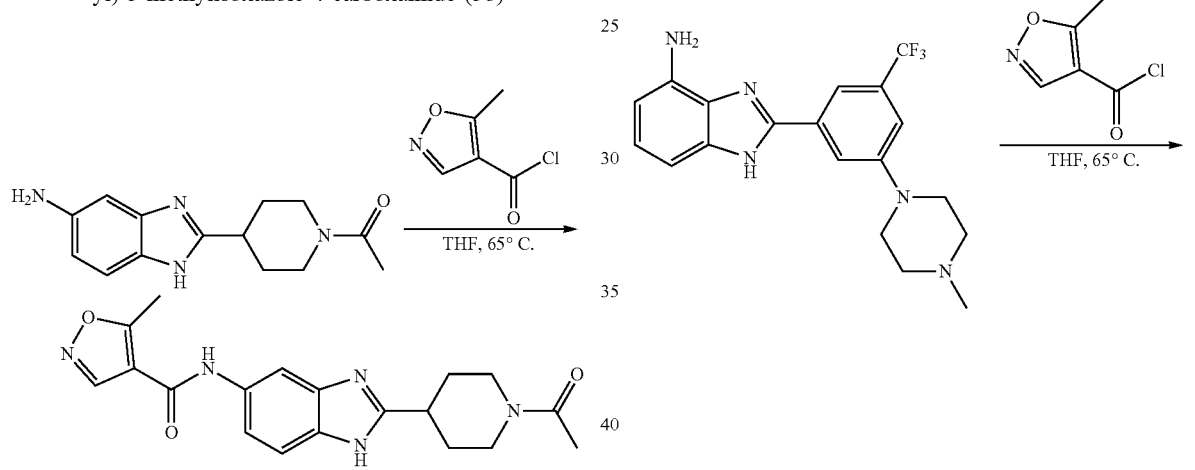

¹H NMR (400 MHz, DMSO) δ 12.20 (s, 1H), 10.03 (s, 1H), 9.12 (s, 1H), 7.95 (s, 1H), 7.40 (d, J=37.8 Hz, 2H), 4.39 (d, J=13.5 Hz, 1H), 3.90 (d, J=13.6 Hz, 1H), 3.25-3.17 (m, 1H), 3.11 (ddd, J=11.2, 7.4, 4.0 Hz, 1H), 2.77 (t, J=11.2 Hz, 1H), 2.69 (s, 3H), 2.03 (s, 5H), 1.83-1.72 (m, 1H), 1.63 (ddd, J=15.9, 12.3, 4.3 Hz, 1H).

EXAMPLE 15

N-(2-cyclopentyl-1H-benz[d]imidazol-5-yl)-5-methylisoxazole-4-carboxamide (5p)

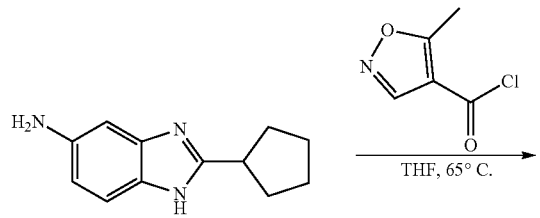

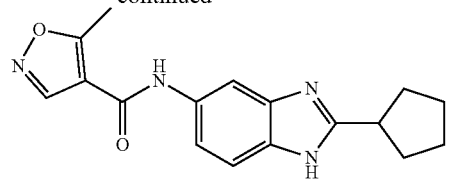

¹H NMR (400 MHz, DMSO) δ 12.26 (s, 1H), 9.99 (s, 1H), 9.08 (s, 1H), 8.14-7.92 (s, 1H), 7.43-7.41 (d, 1H), 7.32-7.02 (dd, 1H), 3.23 (m, 1H), 2.74-2.61 (m, 3H), 2.13-2.00 (m, 2H), 1.95-1.82 (m, 2H), 1.82-1.72 (m, 2H), 1.72-1.60 (m, 2H).

EXAMPLE 16

5-methyl-N-(2-(3-(2-methyl-1H-imidazol-1-yl)-5-(trifluoromethyl)phenyl)-1H-benz[d]imidazol-5-yl)isoxazole-4-carboxamide (6a)

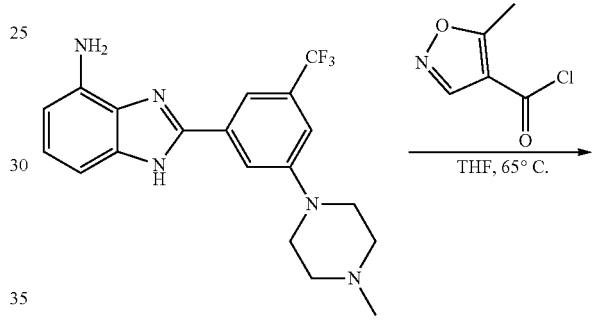

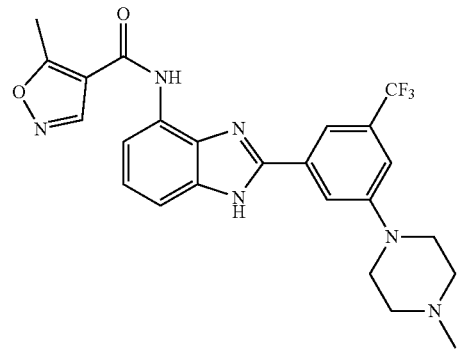

¹H NMR (400 MHz, DMSO) δ 13.21-12.53 (s, 1H), 10.23-10.11 (s, 1H), 9.27-9.19 (s, 1H), 8.03 (s, 1H), 7.97-7.93 (s, 1H), 7.74-7.60 (d, J=7.9 Hz, 1H), 7.42-7.38 (m, 1H), 7.33 (d, J=7.5 Hz, 1H), 7.25 (m, J=16.2, 8.0 Hz, 1H), 3.38 (d, J=4.5 Hz, 4H), 2.74 (d, J=6.6 Hz, 3H), 2.55 (m, 4H), 2.29 (s, 3H); ¹³C NMR (101 MHz, DMSO) δ 173.08, 159.86, 154.55, 151.97, 150.15, 149.86, 137.04, 135.98, 132.02, 126.07, 123.58, 123.36, 116.29, 115.69, 113.24, 112.64, 112.49, 108.42, 54.54, 47.56, 45.73, 12.67; HRMS (ESI+) calculated for $C_{24}H_{23}F_3N_6O_2$ [M+H]+: 485.1835, found 485.2003.

EXAMPLE 17

5-methyl-N-(2-(4-morpholino-3-(trifluoromethyl)phenyl)-1H-benz[d]imidazol-4-yl)isoxazole-4-carboxamide (6b)

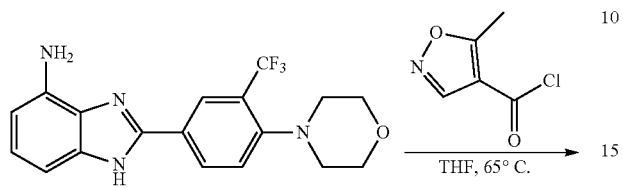

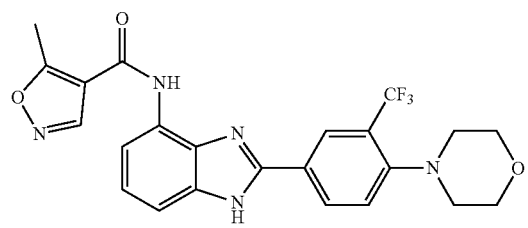

$^1$H NMR (400 MHz, DMSO) δ 13.21-12.51 (s, 1H), 10.12 (s, 1H), 9.21 (s, 1H), 8.53 (s, 1H), 8.48 (dd, J=8.5, 1.8 Hz, 1H), 7.73 (d, J=8.5 Hz, 1H), 7.61-7.30 (m, 2H), 7.23 (t, J=7.9 Hz, 1H), 3.78-3.70 (m, 4H), 3.00-2.93 (m, 4H), 2.73 (s, 3H); $^{13}$C NMR (101 MHz, DMSO) δ 173.21, 159.81, 153.44, 149.86, 132.00, 126.65, 126.01, 125.99, 125.97, 125.95, 125.82, 125.69, 125.22, 123.09, 123.06, 123.04, 123.02, 112.52, 66.97, 53.68, 12.68; HRMS (ESI+) calculated for $C_{23}H_{20}F_3N_5O_3$ [M+H]+: 472.1518, found 472.2495.

EXAMPLE 18

5-methyl-N-(2-(3-(4-methyl-1H-imidazol-1-yl)-5-(trifluoromethyl)phenyl)-1H-benz[d]imidazol-4-yl)isoxazole-4-carboxamide (6c)

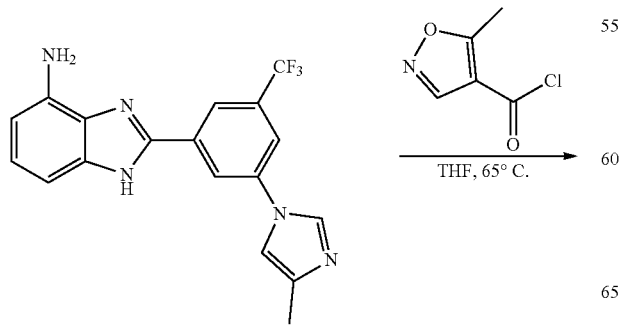

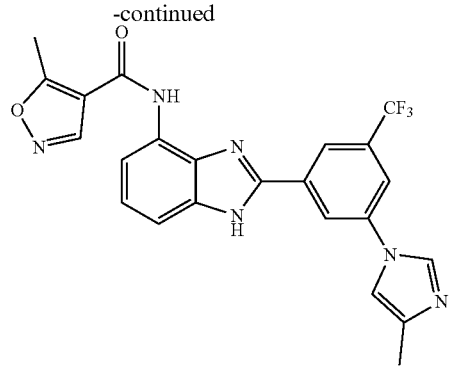

$^1$H NMR (400 MHz, DMSO) δ 13.33-12.62 (s, 1H), 10.31-10.08 (s, 1H), 9.26-9.17 (s, 1H), 8.67 (s, 1H), 8.48 (d, J=6.2 Hz, 1H), 8.39 (s, 1H), 8.15 (s, 1H), 7.78 (d, J=7.7 Hz)-7.65 (d, J=15.3 Hz, 2H), 7.42 (d, J=8.0 Hz)-7.28 (t, J=7.7 Hz, 2H), 2.73 (s, 3H), 2.21 (s, 3H); $^{13}$C NMR (101 MHz, DMSO) δ 173.43, 160.96, 159.88, 149.83, 140.10, 137.79, 137.76, 135.48, 135.44, 133.29, 133.26, 132.32, 132.29, 131.82, 131.76, 125.76, 125.25, 118.34, 117.05, 112.49, 112.46, 12.73, 12.70; HRMS (ESI+) calculated for $C_{23}H_{17}F_3N_6O_2$ [M+H]+: 467.1365, found 467.1763.

EXPERIMENTAL EXAMPLE 1

Measurement of FLT3 Enzyme Activity

A change in FLT3 enzyme activity by treatment with the benzimidazole derivatives of the following Table 1 according to the present invention was confirmed by IC$_{50}$.

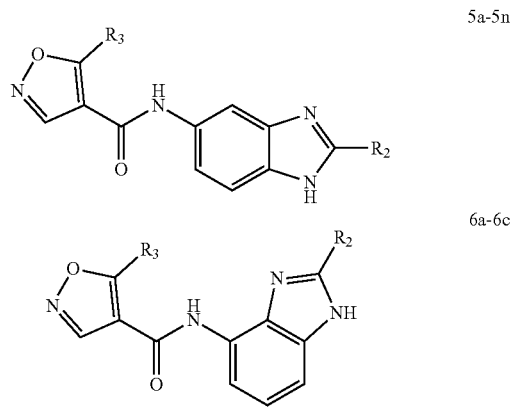

TABLE 1

| Example | Compound No. | R$_2$ | R$_3$ |
|---|---|---|---|
| 1 | 5a | ![piperazine-phenyl-CF3] | CH$_3$ |

TABLE 1-continued
| Example | Compound No. | R₂ | R₃ |
|---|---|---|---|
| 2 | 5b | 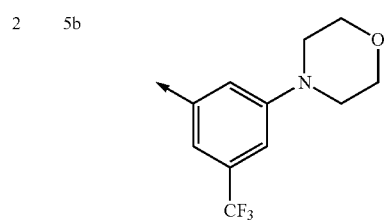 | CH₃ |
| 3 | 5c | 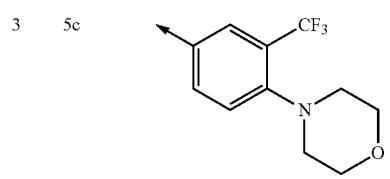 | CH₃ |
| 4 | 5d | 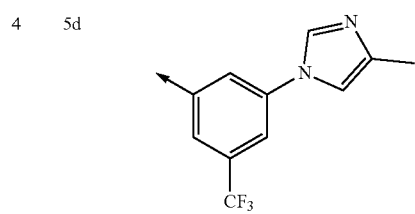 | CH₃ |
| 5 | 5e | 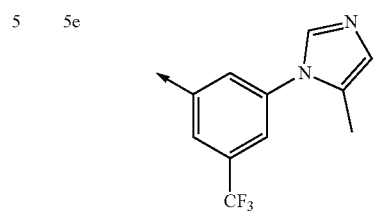 | CH₃ |
| 6 | 5f | 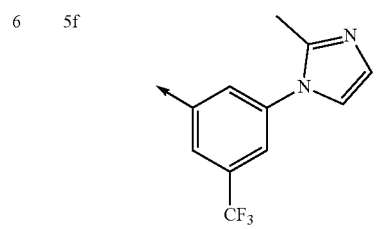 | CH₃ |
| 7 | 5h | 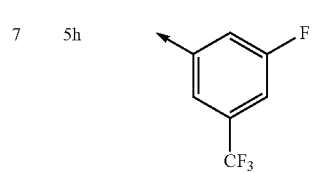 | CH₃ |
| 8 | 5i | 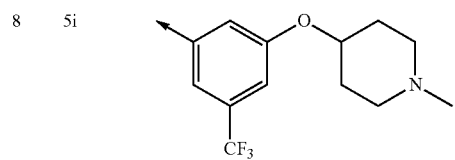 | CH₃ |
| 9 | 5j | 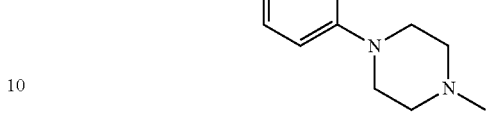 | CH₃ |
| 10 | 5k | 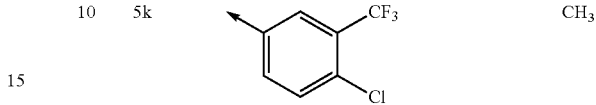 | CH₃ |
| 11 | 5l | 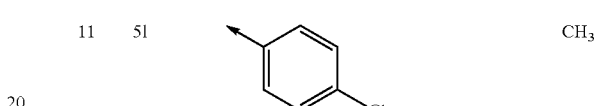 | CH₃ |
| 12 | 5m | 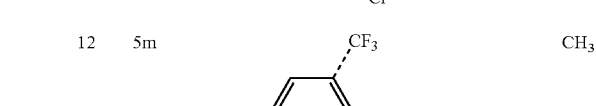 | CH₃ |
| 13 | 5n | 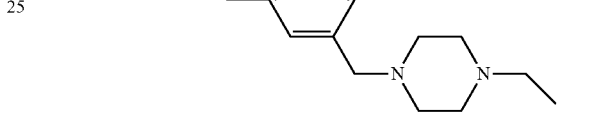 | CH₃ |
| 14 | 5o | 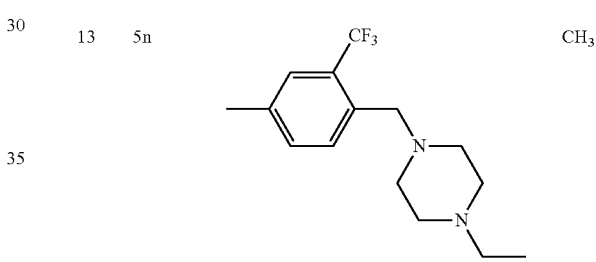 | CH₃ |
| 15 | 5p | 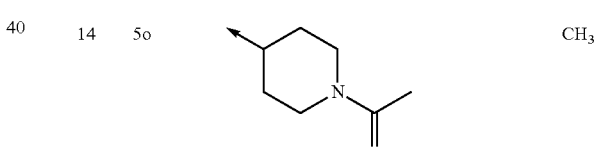 | CH₃ |
| 16 | 6a | 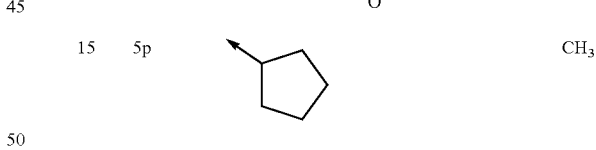 | CH₃ |
| 17 | 6b | 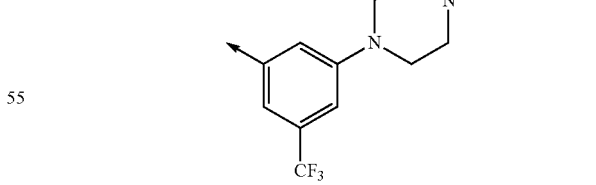 | CH₃ |

TABLE 1-continued

| Example | Compound No. | R₂ | R₃ |
|---------|--------------|-----|-----|
| 18 | 6c | 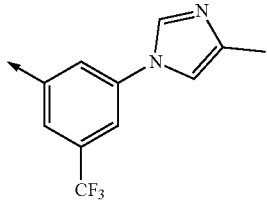 | CH₃ |

The results of evaluating the FLT3 kinase activity of all benzimidazole compounds 5a to 5p and 6a to 6c are shown in Table 2. Among the synthesized derivatives, compounds containing piperazine, morpholine and imidazole structures showed selective activity against FLT3. Among them, Compound 5a showed an activity of $IC_{50}$=495 nM against FLT3. Based on the following data, a structure-activity relationship (SAR) analysis was performed. First, the benzimidazole compounds exhibited different results depending on the position of a substituent on a phenyl ring. Both Compounds 5b and 5c maintained comparable levels of activity with $IC_{50}$=7.94 and 10 μM regardless of 1,3,5- or 1,3,4-substituted phenyl rings and substitution positions, respectively. Second, the inhibitory activity of the compound showed a significant difference depending on the position of the methyl substituent on the imidazole. The imidazole compounds (5d and 5e) having a methyl group substituted at the fourth or fifth position exhibited about 6 to 8-fold higher activity than the imidazole compound 5f having a methyl group substituted at the second position.

The $IC_{50}$ values of the compounds of Examples 1 to 18 with respect to FLT3 enzyme activity are shown in the following Table 2, and it can be seen that the benzimidazole derivative according to the present invention has excellent inhibitory activity against FLT3.

TABLE 2

| Example | Compound No. | FLT3 (IC50) |
|---------|--------------|-------------|
| 1 | 5a | +++ |
| 2 | 5b | ++ |
| 3 | 5c | ++ |
| 4 | 5d | +++ |
| 5 | 5e | +++ |
| 6 | 5f | + |
| 7 | 5h | + |
| 8 | 5i | ++ |
| 9 | 5j | + |
| 10 | 5k | ++ |
| 11 | 5l | ++ |
| 12 | 5m | ++ |
| 13 | 5n | ++ |
| 14 | 5o | + |
| 15 | 5p | + |
| 16 | 6a | +++ |
| 17 | 6b | + |
| 18 | 6c | ++ |

+: when the $IC_{50}$ value >10 μM
++: when the $IC_{50}$ value is 3 to 10 μM
+++: when the $IC_{50}$ value <3 μM

EXPERIMENTAL EXAMPLE 2

Measurement of Inhibitory Activity Against Various Protein Kinases

Kinase panel screening was performed on the example Compounds 5a (Table 3) and 5b (Table 4) for 35 or more other kinases at a single dose of 10 μM. Compound 5a exhibited an inhibitory activity of 89.97% and 88.48% against FLT3 and FLT3 (ITD), respectively, but did not exhibit significant activity against other protein kinases, particularly FMS. Overall, this result indicates that the kinase activity profile and selectivity of the original FMS inhibitor changed dramatically as a result of structural rigidity.

TABLE 3

| Kinase | % inhibition rate | Staurosporine IC₅₀ (nM) |
|--------|-------------------|-------------------------|
| ABL1 | 17.095 | 31.0 |
| AKT1 | 11.91 | 1.98 |
| ALK | 12.61 | 2.35 |
| Aurora A | 12.49 | 0.502 |
| BRAF | 7.31 | 7.59 [a] |
| BRAF (V599E) | 11.905 | 7.93 [a] |
| BTK | 15.58 | 23.4 |
| c-Kit | 15.545 | 8.69 |
| c-MET | 9.18 | 97.7 |
| c-Src | 0.00 | 67.8 |
| CDK1/cyclinB | 9.31 | 3.46 |
| CDK2/cyclin E | 1.785 | 1.97 |
| EGFR | 4.095 | 3.37 |
| ERK1 | 5.18 | 73.2 |
| FGFR3 | 2.805 | 14.7 [b] |
| FLT1/VEGFR1 | 12.72 | 15.5 |
| FLT3 | 89.97 | 10.6 |
| FLT3 (ITD) | 88.48 | 0.97 |
| FMS | 0.00 | 1.54 |
| GSK3b | 3.975 | 2.90 |
| IGF1R | 7.135 | 25.2 |
| JAK3 | 0 | 640.0 [c] |
| JNK3 | 7.12 | 8.60 |
| KDR/VEGFR2 | 13.215 | 4.27 |
| LCK | 0.625 | 1.02 |
| LYN | 15.21 | 23.6 |
| MEK1 | 18.82 | 150.7 |
| MTOR/FRAP1 | 2.355 | 12.3 [d] |
| P38a/MAPK14 | 0 | 0.55 |
| PKA | 8.455 | 77.3 |
| PLK1 | 17.38 | 11.0 |
| RAF1 | 8.475 | 80.5 |
| RIPK3 | 12.705 | 0.14 |
| RON/MSTIR | 0 | 0.39 |

[a] Data of GW5074[18]
[b] Data of SCH772984[19,20]
[c] Data of JNKI VIII[21,22]
[d] Data of SB202190[23]

TABLE 4

| Kinase | % inhibition rate | Staurosporine IC₅₀ (nM) |
|--------|-------------------|-------------------------|
| ABL1 | 0.00 | 31.0 |
| AKT1 | 10.89 | 1.98 |
| ALK | 0.00 | 2.35 |
| Aurora A | 6.40 | 0.502 |
| BRAF wild | 0.00 | 7.59 [a] |
| BRAF (V599E) | 25.18 | 7.93 [a] |
| BTK | 19.32 | 23.4 |
| c-Kit | 0.00 | 8.69 |
| c-MET | 0.00 | 97.7 |
| c-Src | 0.00 | 67.8 |
| CDK1/cyclin B | 2.76 | 3.46 |
| CDK2/cyclin E | 0.00 | 1.97 |
| EGFR | 0.00 | 3.37 |

TABLE 4-continued

| Kinase | % inhibition rate | Staurosporine IC$_{50}$ (nM) |
| --- | --- | --- |
| ERK1 | 0.00 | 73.2 |
| FGFR3 | 0.00 | 14.7 [b] |
| FLT1/VEGFR1 | 0.00 | 15.5 |
| FLT3 | 73.00 | 10.6 |
| FMS | 0.00 | 0.97 |
| GSK3b | 2.80 | 1.54 |
| IGF1R | 0.00 | 2.90 |
| JAK3 | 0.94 | 25.2 |
| JNK3 | 0.00 | 640.0 [c] |
| KDR/VEGFR2 | 0.00 | 8.60 |
| LCK | 0.00 | 4.27 |
| LYN | 0.00 | 1.02 |
| MEK1 | 0.00 | 23.6 |
| mTor | 0.00 | 150.7 |
| P38a/MAPK14 | 0.00 | 12.3 [d] |
| PKA | 2.38 | 0.55 |
| PLK1 | 2.86 | 77.3 |
| RAF1 | 15.73 | 11.0 |
| RON/MSTIR | 0.00 | 80.5 |
| ROS/ROS1 | 7.40 | 0.14 |
| SYK | 2.18 | 0.39 |

[a] Data of GW5074[18]
[b] Data of SCH772984[19,20]
[c] Data of JNKI VIII[21,22]
[d] Data of SB202190[23]

The above-described description of the present invention is provided for illustrative purposes, and those skilled in the art to which the present invention pertains will understand that the present invention can be easily modified into other specific forms without changing the technical spirit or essential features of the present invention. Therefore, it should be understood that the above-described embodiments are only exemplary in all aspects and are not restrictive.

The invention claimed is:

1. A compound of the following Chemical Formula 1 or a pharmaceutically acceptable salt thereof:

[Chemical Formula 1]

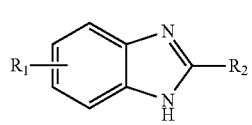

in Chemical Formula 1,
R is

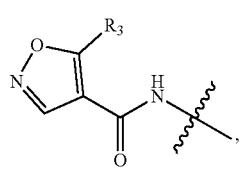

$R_2$ is selected from the group consisting of

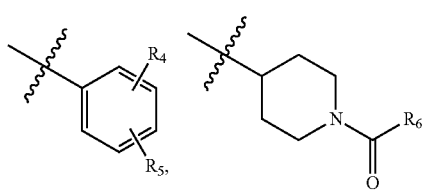

and a $C_3$-$C_7$ cycloalkyl, $R_3$ is hydrogen, hydroxy, a $C_1$-$C_6$ alkyl or a $C_1$-$C_6$ alkyl halide, $R_4$ and $R_5$ are each independently selected from the group consisting of hydrogen, a $C_1$-$C_6$ alkyl,

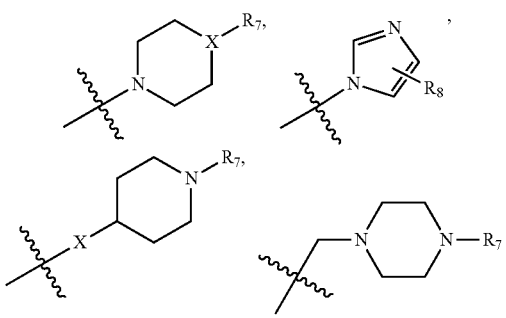

a $C_1$-$C_6$ alkyl halide and a halogen, $R_6$ is hydrogen or a $C_1$-$C_6$ alkyl, and wherein, X is methylene, a nitrogen or an oxygen atom, and $R_7$ and $R_8$ are each independently hydrogen or a $C_1$-$C_6$ alkyl, provided that a case where 1) both $R_4$ and $R_5$ are hydrogen;

2) Both $R_4$ and $R_5$ are a halogen; or

3) $R_4$ and $R_5$ consist only of hydrogen and a halogen is excluded.

2. The compound of claim 1, wherein the compound of Chemical Formula 1 has a structure of the following Chemical Formula 2:

[Chemical Formula 2]

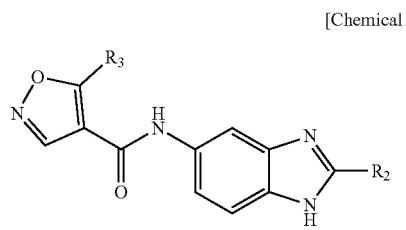

in Chemical Formula 2,
$R_2$ is selected from the group consisting of

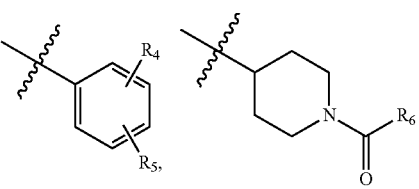

and a $C_3$-$C_7$ cycloalkyl, $R_3$ is hydrogen, hydroxy, a $C_1$-$C_6$ alkyl or a $C_1$-$C_6$ alkyl halide, $R_4$ and $R_5$ are each independently selected from the group consisting of hydrogen, a $C_1$-$C_6$ alkyl,

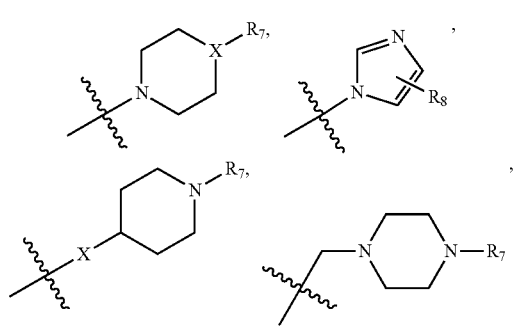

a $C_1$-$C_6$ alkyl halide and a halogen, $R_6$ is hydrogen or a $C_1$-$C_6$ alkyl, and wherein, X is methylene, a nitrogen or an oxygen atom, and $R_7$ and $R_5$ are each independently hydrogen or a $C_1$-$C_6$ alkyl, provided that a case where 1) both $R_4$ and $R_5$ are hydrogen;

2) Both $R_4$ and $R_5$ are a halogen; or

3) $R_4$ and $R_5$ consist only of hydrogen and a halogen is excluded.

3. The compound of claim 1, wherein the compound of Chemical Formula 1 has a structure of the following Chemical Formula 3:

[Chemical Formula 3]

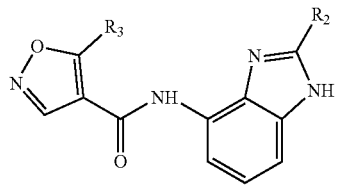

in Chemical Formula 3, $R_2$ is selected from the group consisting of

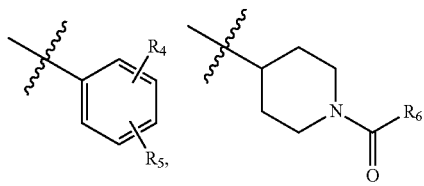

and a $C_3$-$C_7$ cycloalkyl, $R_3$ is hydrogen, hydroxy, a $C_1$-$C_6$ alkyl or a $C_1$-$C_6$ alkyl halide, $R_4$ and $R_5$ are each independently selected from the group consisting of hydrogen, a $C_1$-$C_6$ alkyl,

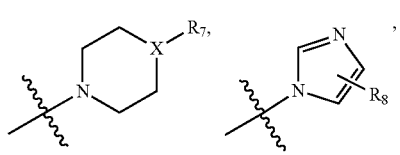

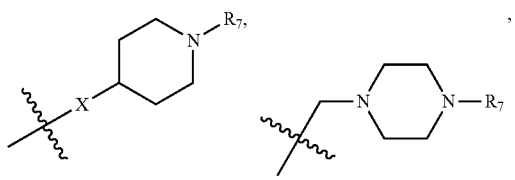

a $C_1$-$C_6$ alkyl halide and a halogen, $R_6$ is hydrogen or a $C_1$-$C_6$ alkyl, and wherein, X is methylene, a nitrogen or an oxygen atom, and $R_7$ and $R_8$ are each independently hydrogen or a $C_1$-$C_6$ alkyl, provided that a case where 1) both $R_4$ and $R_5$ are hydrogen;

2) Both $R_4$ and $R_5$ are a halogen; or

3) $R_4$ and $R_5$ consist only of hydrogen and a halogen is excluded.

4. The compound of claim 1, wherein $R_2$ is

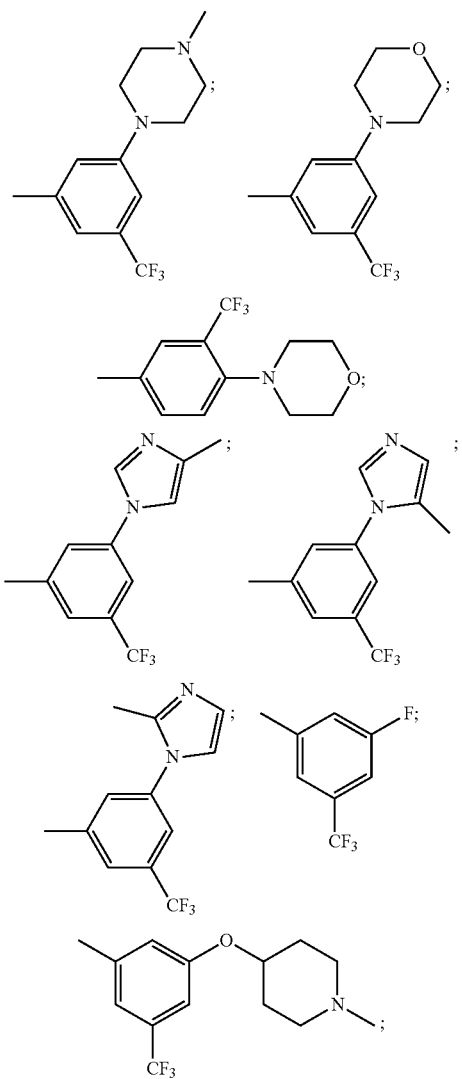

5. The compound of claim 1, wherein $R_3$ is a $C_1$-$C_6$ alkyl.

6. The compound of claim 2, wherein in Chemical Formula 2, $R_3$ is a $C_1$-$C_6$ alkyl, and $R_2$ is 7. The compound of claim 3, wherein in Chemical Formula 3, $R_3$ is a $C_1$-$C_6$ alkyl, and $R_2$ is -continued

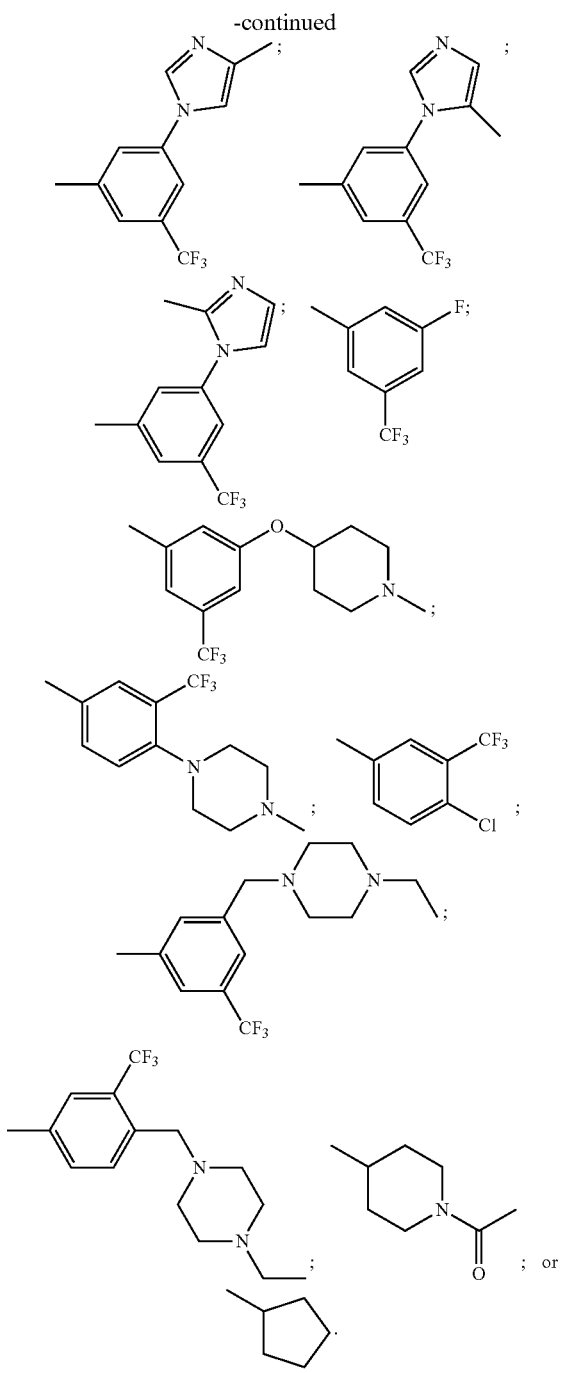

8. The compound of claim 1, wherein the compound of Chemical Formula 1 is
5-methyl-N-(2-(3-(4-methylpiperazin-1-yl)-5-(trifluoromethyl)phenyl)-1H-benz[d]imidazol-5-yl) isoxazole-4-carboxamide;
5-methyl-N-(2-(3-morpholino-5-(trifluoromethyl)phenyl)-1H-benz[d]imidazol-5-yl) isoxazole-4-carboxamide;
5-methyl-N-(2-(4-morpholino-3-(trifluoromethyl)phenyl)-1H-benz[d]imidazol-5-yl) isoxazole-4-carboxamide;
5-methyl-N-(2-(3-(4-methyl-1H-imidazol-1-yl)-5-(trifluoromethyl)phenyl)-1H-benz[d]imidazol-5-yl) isoxazole-4-carboxamide;
5-methyl-N-(2-(3-(5-methyl-1H-imidazol-1-yl)-5-(trifluoromethyl)phenyl)-1H-benz[d]imidazol-5-yl) isoxazole-4-carboxamide;
5-methyl-N-(2-(3-(2-methyl-1H-imidazol-1-yl)-5-(trifluoromethyl)phenyl)-1H-benz[d]imidazol-5-yl) isoxazole-4-carboxamide;
5-methyl-N-(2-4-(4-methylpiperazin-1-yl)-3-(trifluoromethyl)phenyl)-1H-benz[d]imidazol-5-yl) isoxazole-4-carboxamide;
5-methyl-N-(2-3-((1-methylpiperazin-4-yl)oxy)-5-(trifluoromethyl)phenyl)-1H-benz[d]imidazol-5-yl) isoxazole-4-carboxamide;
N-(2-(3-fluoro-5-(trifluoromethyl)phenyl)-1H-benz[d]imidazol-5-yl)-5-methylisoxazole-4-carboxamide;
N-(2-(4-chloro-3-(trifluoromethyl)phenyl)-1H-benz[d]imidazol-5-yl)-5-methylisoxazole-4-carboxamide;
N-(2-(3-((4-ethylpiperazin-1-yl)methyl)-5-(trifluoromethyl)phenyl)-1H-benz[d]imidazol-5-yl)-5-methylisoxazole-4-carboxamide;
N-(2-(4-((4-ethylpiperazin-1-yl)methyl)-3-(trifluoromethyl)phenyl)-1H-benz[d]imidazol-5-yl)-5-methylisoxazole-4-carboxamide;
N-(2-(1-acetylpiperidin-4-yl)-1H-benz[d]imidazol-5-yl)-5-methylisoxazole-4-carboxamide;
N-(2-cyclopentyl-1H-benz[d]imidazol-5-yl)-5-methylisoxazole-4-carboxamide;
5-methyl-N-(2-(3-(2-methyl-1H-imidazol-1-yl)-5-(trifluoromethyl)phenyl)-1H-benz[d]imidazol-5-yl) isoxazole-4-carboxamide;
5-methyl-N-(2-(4-morpholino-3-(trifluoromethyl)phenyl)-1H-benz[d]imidazol-4-yl) isoxazole-4-carboxamide; or
5-methyl-N-(2-(3-(4-methyl-1H-imidazol-1-yl)-5-(trifluoromethyl)phenyl)-1H-benz[d]imidazol-4-yl) isoxazole-4-carboxamide.

9. A method for treating acute myeloid leukemia (AML), the method comprising: administering the compound or the pharmaceutically acceptable salt thereof according to claim 1 to an individual or subject in need thereof.

* * * * *

UNITED STATES PATENT AND TRADEMARK OFFICE
CERTIFICATE OF CORRECTION

PATENT NO. : 12,473,278 B2
APPLICATION NO. : 17/634010
DATED : November 18, 2025
INVENTOR(S) : Jung Mi Hah and Da Seul Im Page 1 of 1

It is certified that error appears in the above-identified patent and that said Letters Patent is hereby corrected as shown below:

On the Title Page

Item [71], delete "Hangyang" and insert -- Hanyang --.

In the Claims

In Claim 1, Column 49, Line 46, replace "R is" with -- $R_1$ is --.

In Claim 2, Column 51, Line 19, replace "$R_7$ and $R_5$" with -- $R_7$ and $R_8$ --.

Signed and Sealed this
Thirtieth Day of December, 2025

John A. Squires
*Director of the United States Patent and Trademark Office*